Nov. 10, 1970   C. D. NEUENSCHWANDER   3,538,618
GRAIN DRYING APPARATUS
Original Filed July 26, 1968   14 Sheets-Sheet 2
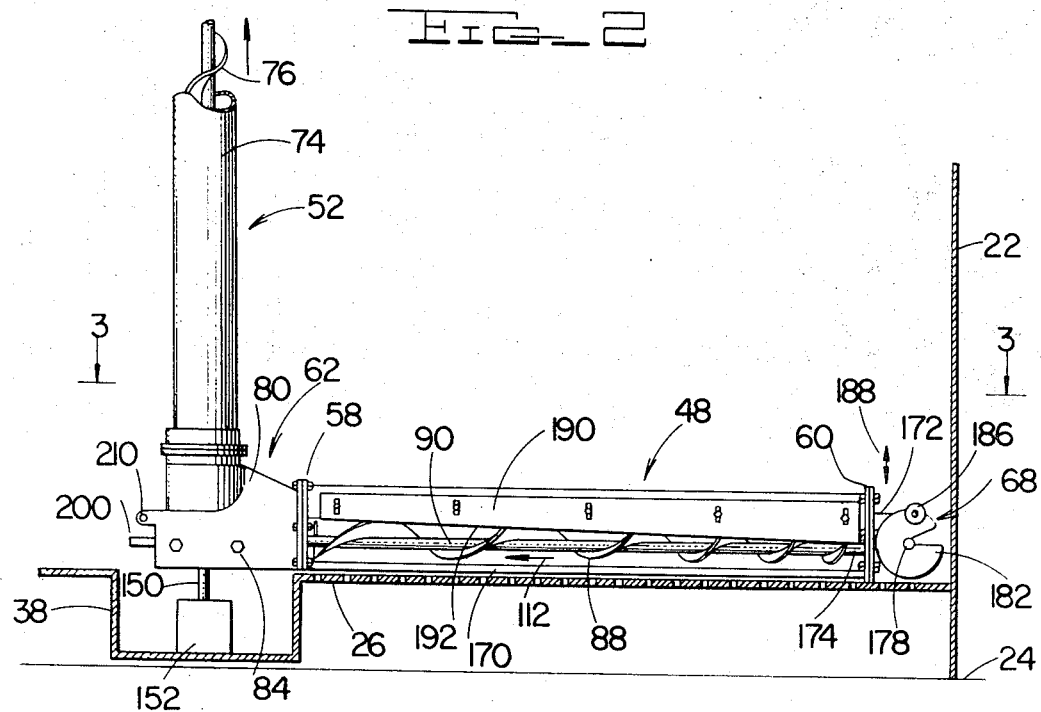
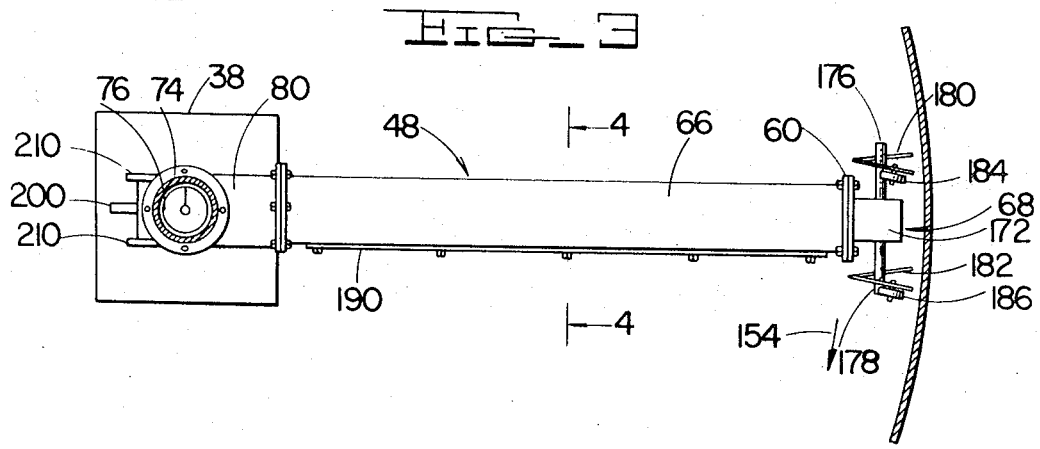
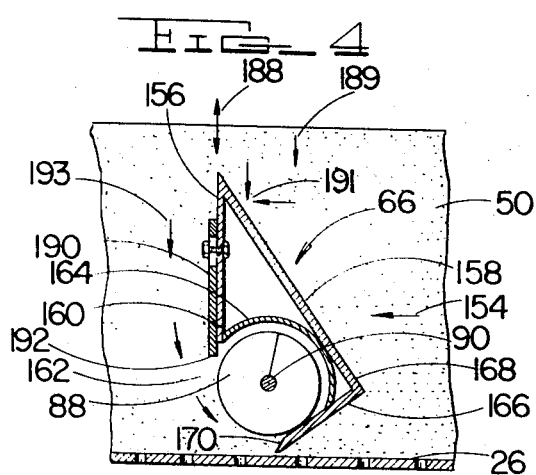
INVENTOR
CHARLES D. NEUENSCHWANDER
Hood, Gust, Irish & Lundy
ATTORNEYS

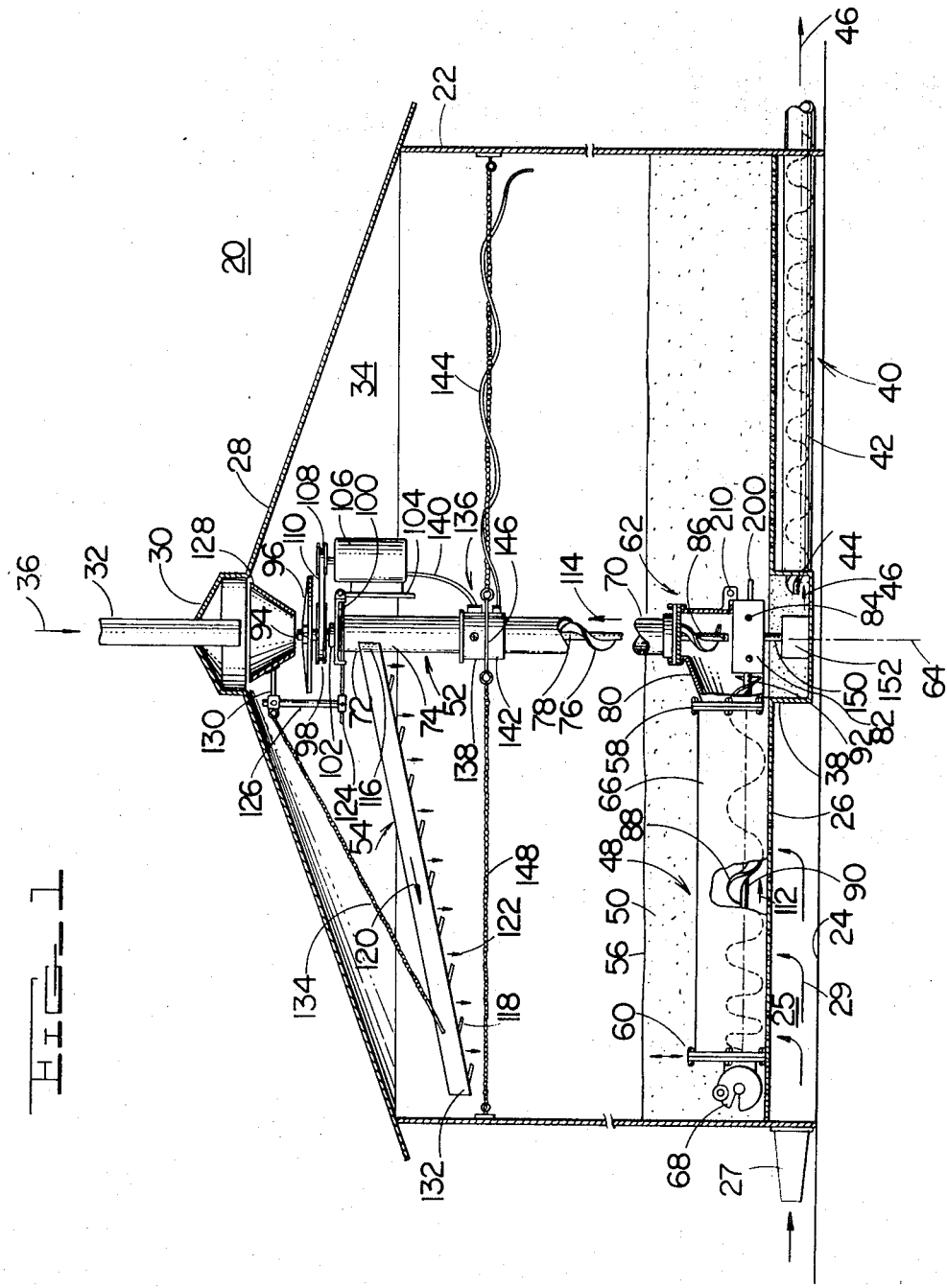

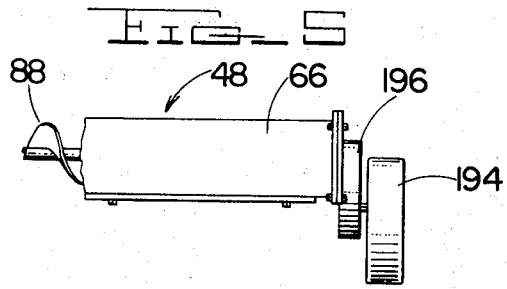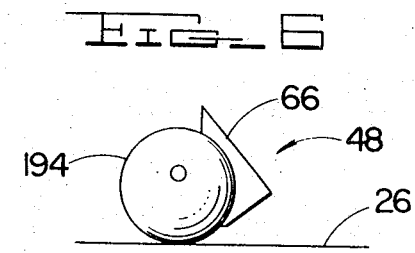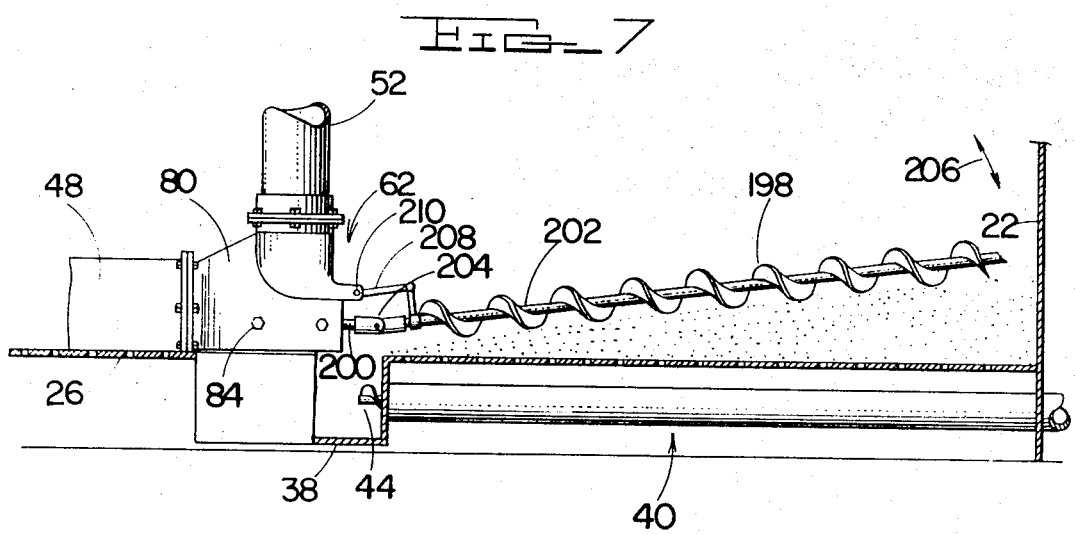

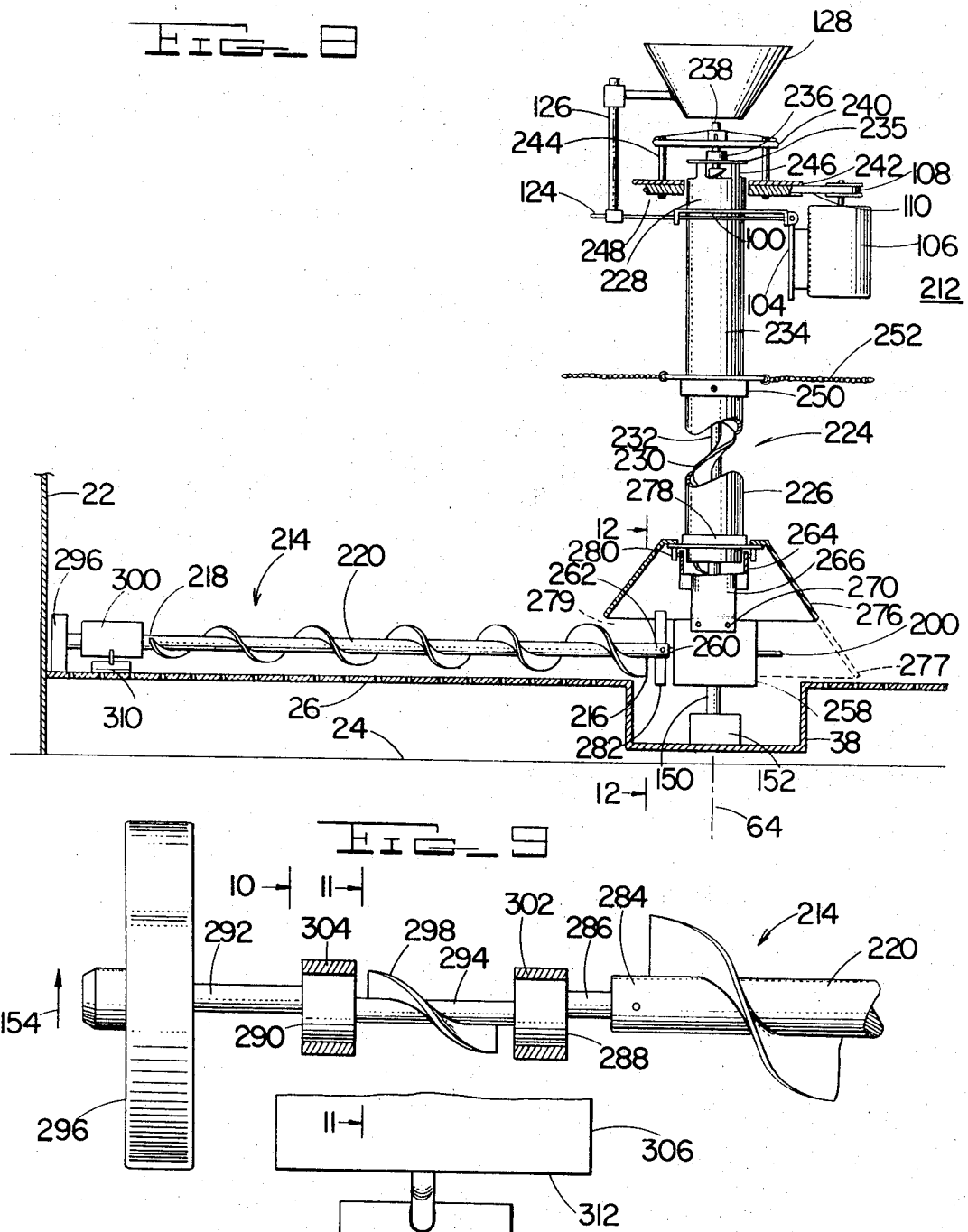

Nov. 10, 1970   C. D. NEUENSCHWANDER   3,538,618
GRAIN DRYING APPARATUS
Original Filed July 26, 1968                14 Sheets-Sheet 5
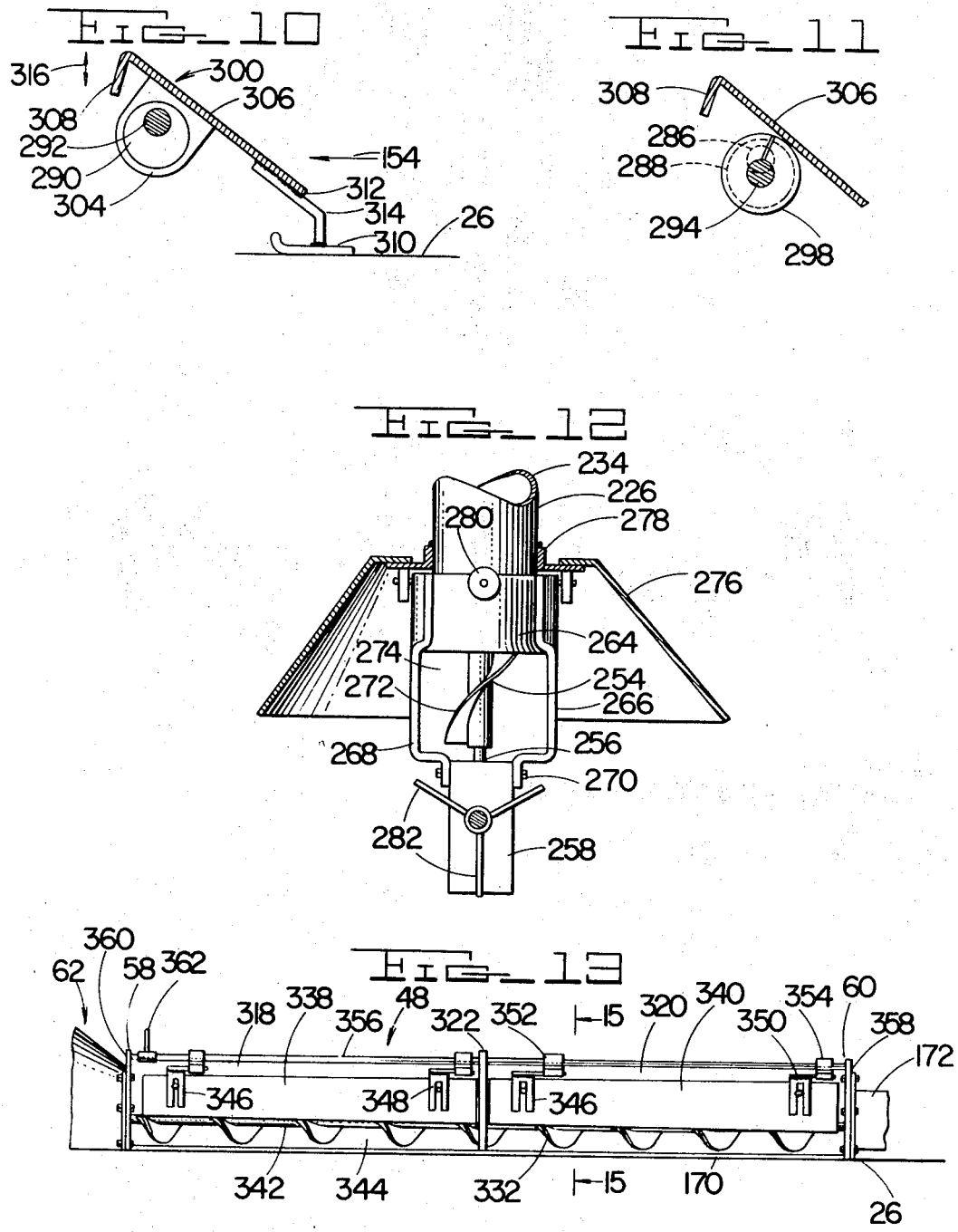
INVENTOR
CHARLES D. NEUENSCHWANDER
Hood, Gust, Irish & Lundy
ATTORNEYS Nov. 10, 1970   C. D. NEUENSCHWANDER   3,538,618
GRAIN DRYING APPARATUS
Original Filed July 26, 1968   14 Sheets-Sheet 6
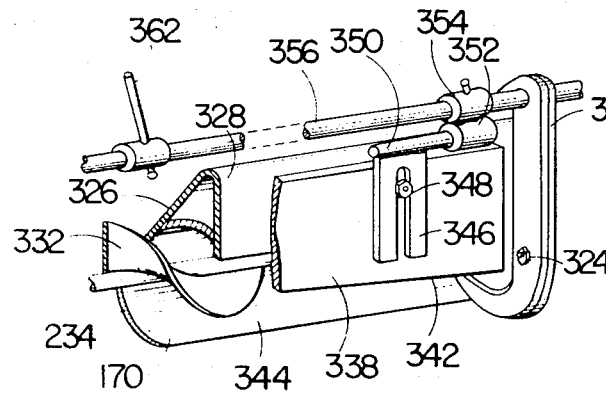
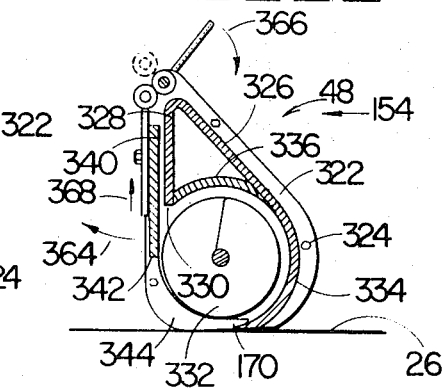
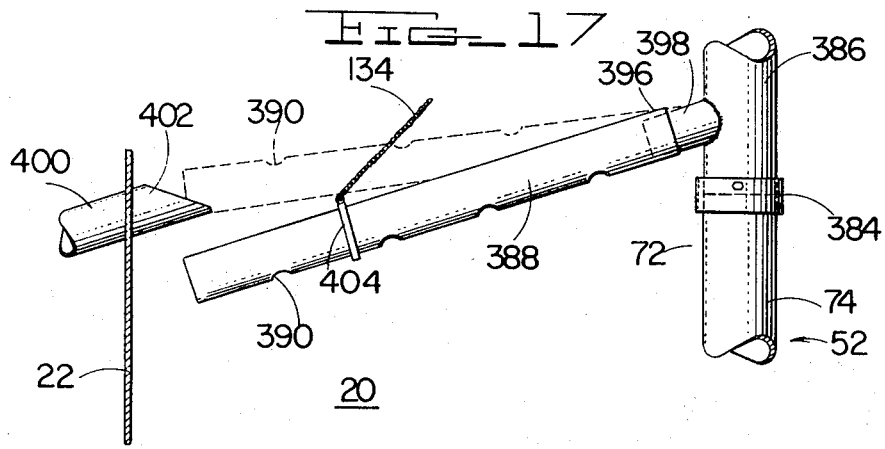
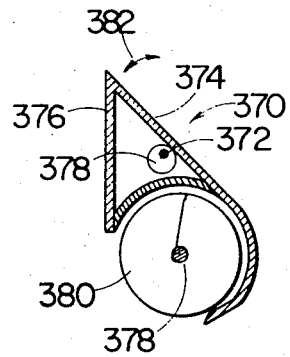
INVENTOR
CHARLES D. NEUENSCHWANDER
ATTORNEYS

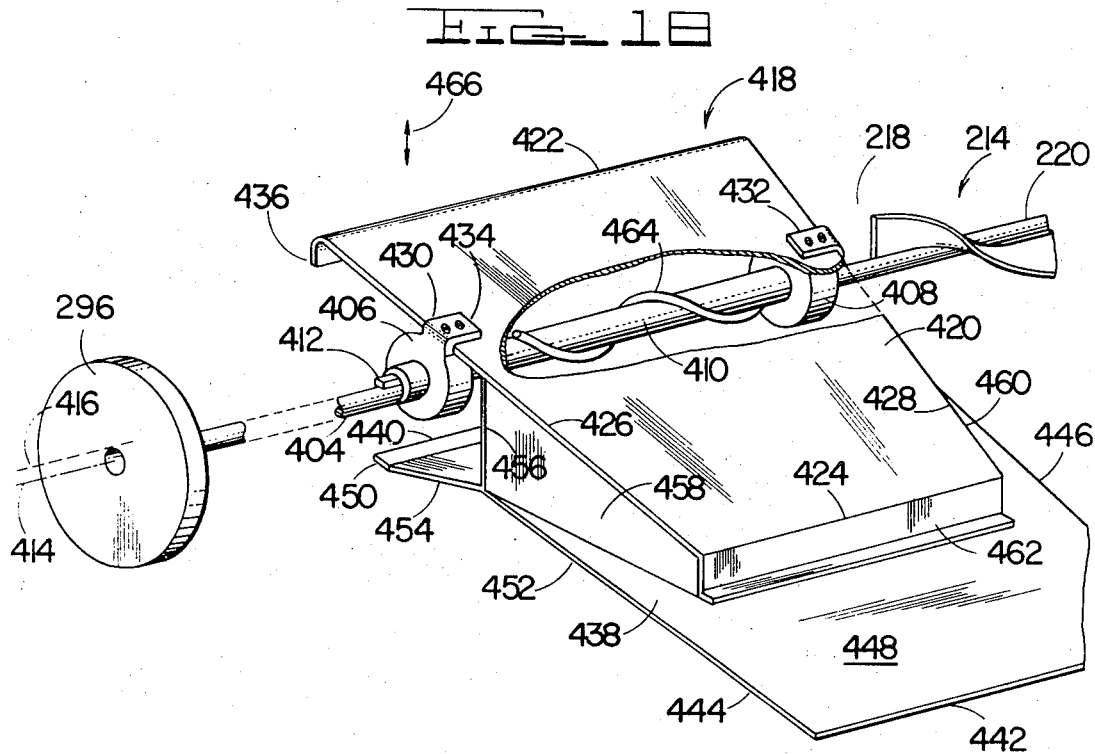
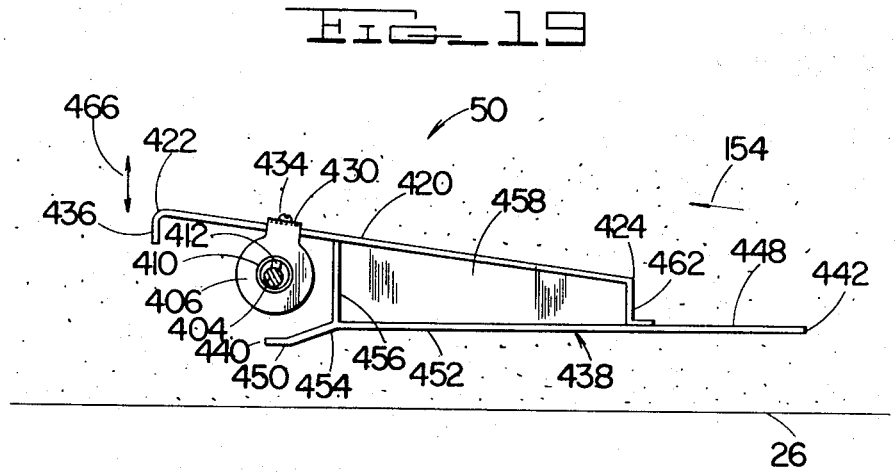

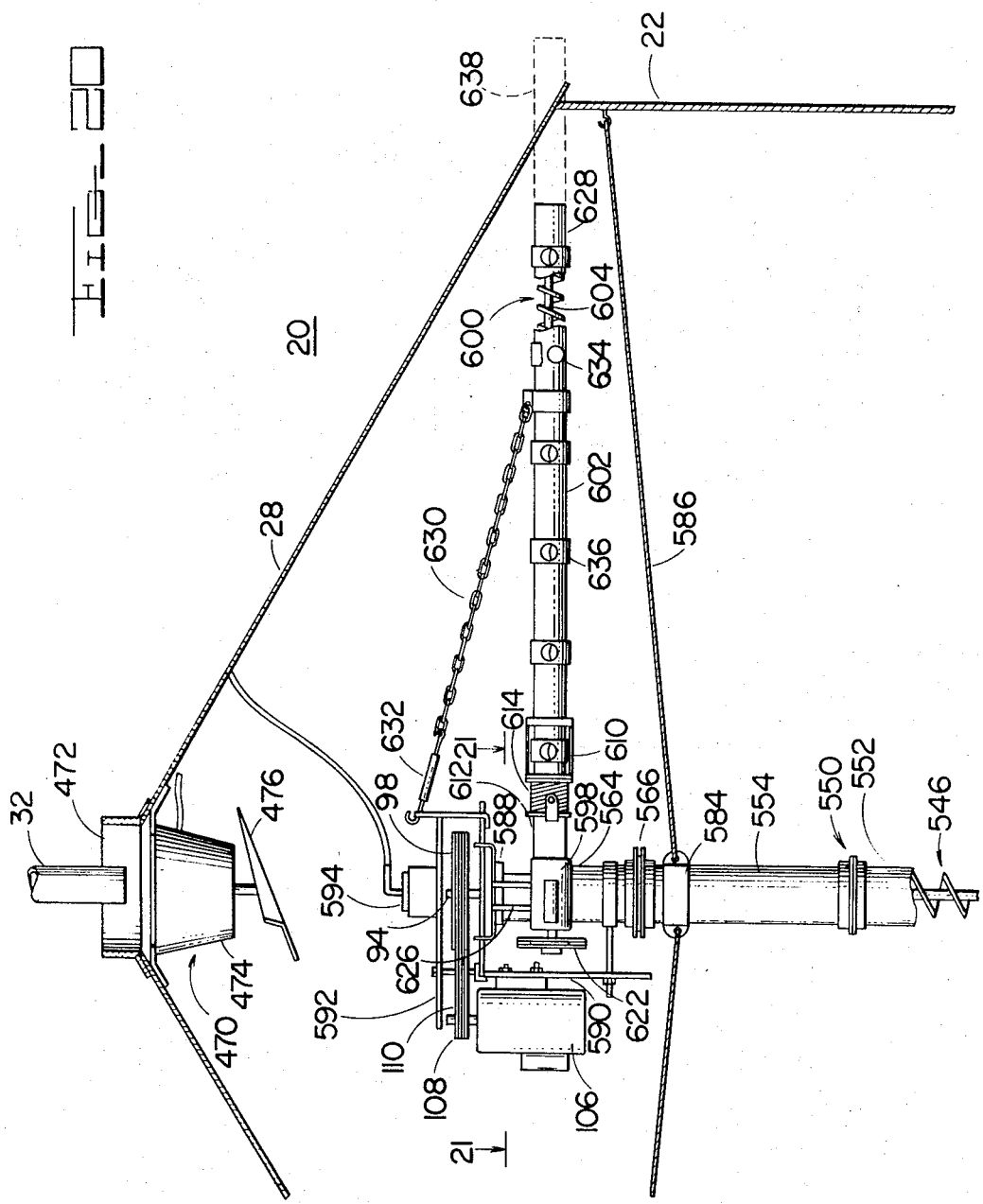

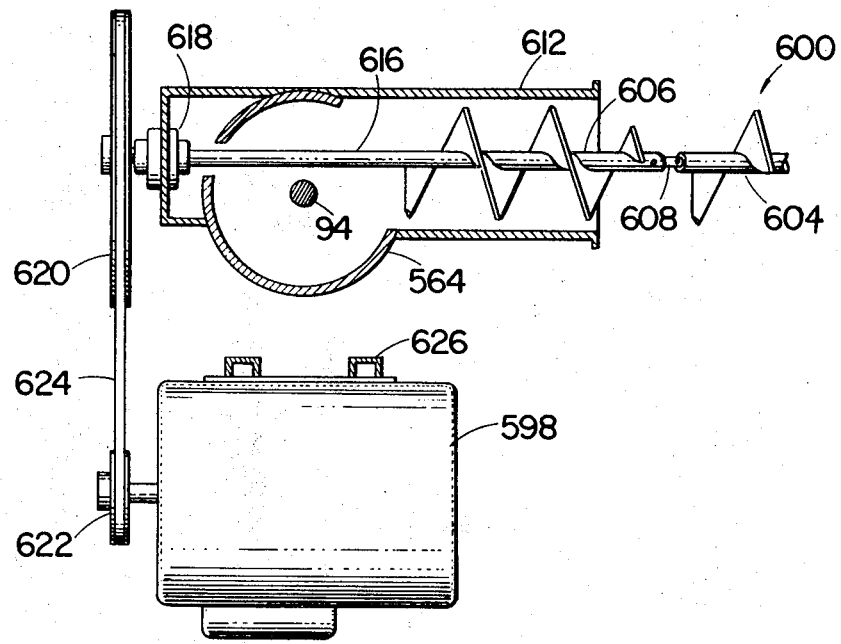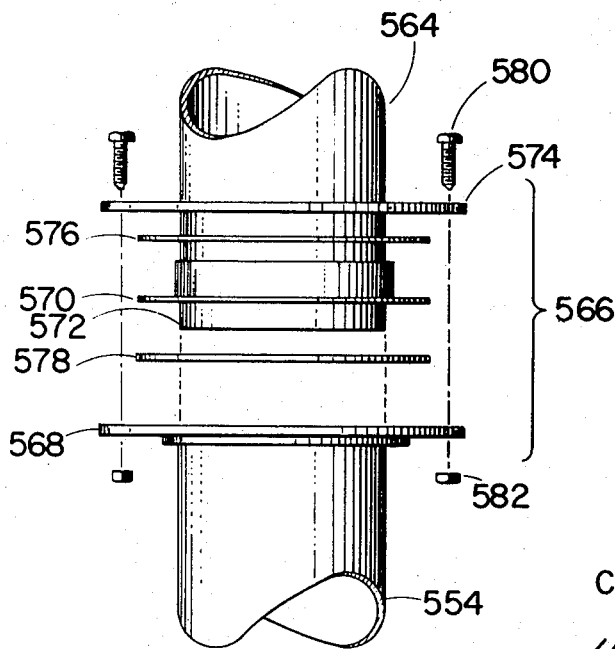

Nov. 10, 1970     C. D. NEUENSCHWANDER     3,538,618
GRAIN DRYING APPARATUS
Original Filed July 26, 1968     14 Sheets-Sheet 10
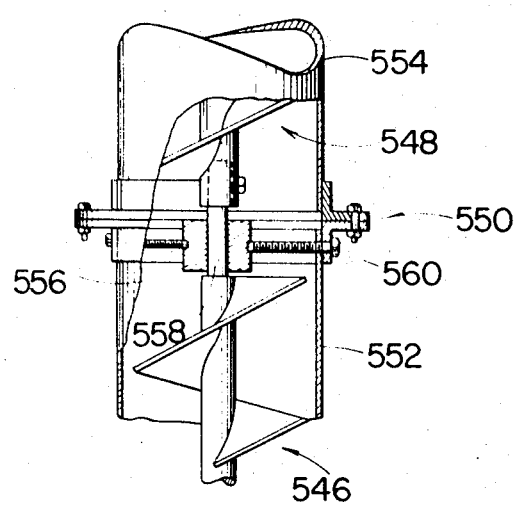
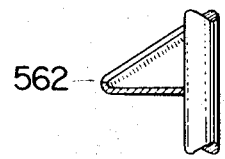
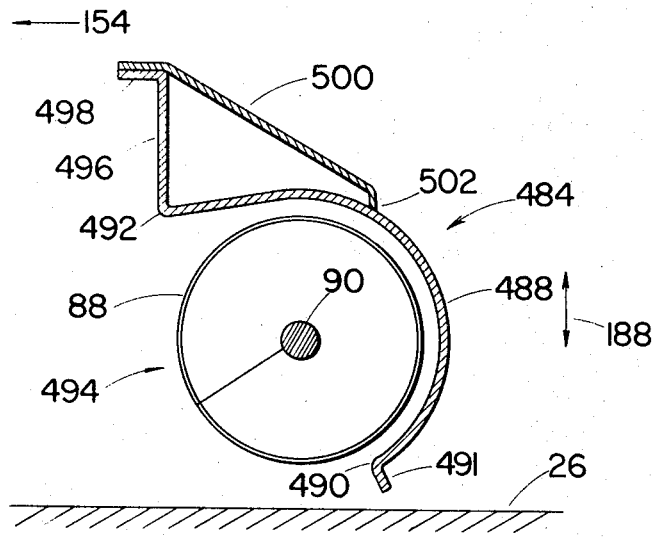
INVENTOR
CHARLES D. NEUENSCHWANDER
Hood, Gust, Irish & Lundy
ATTORNEYS

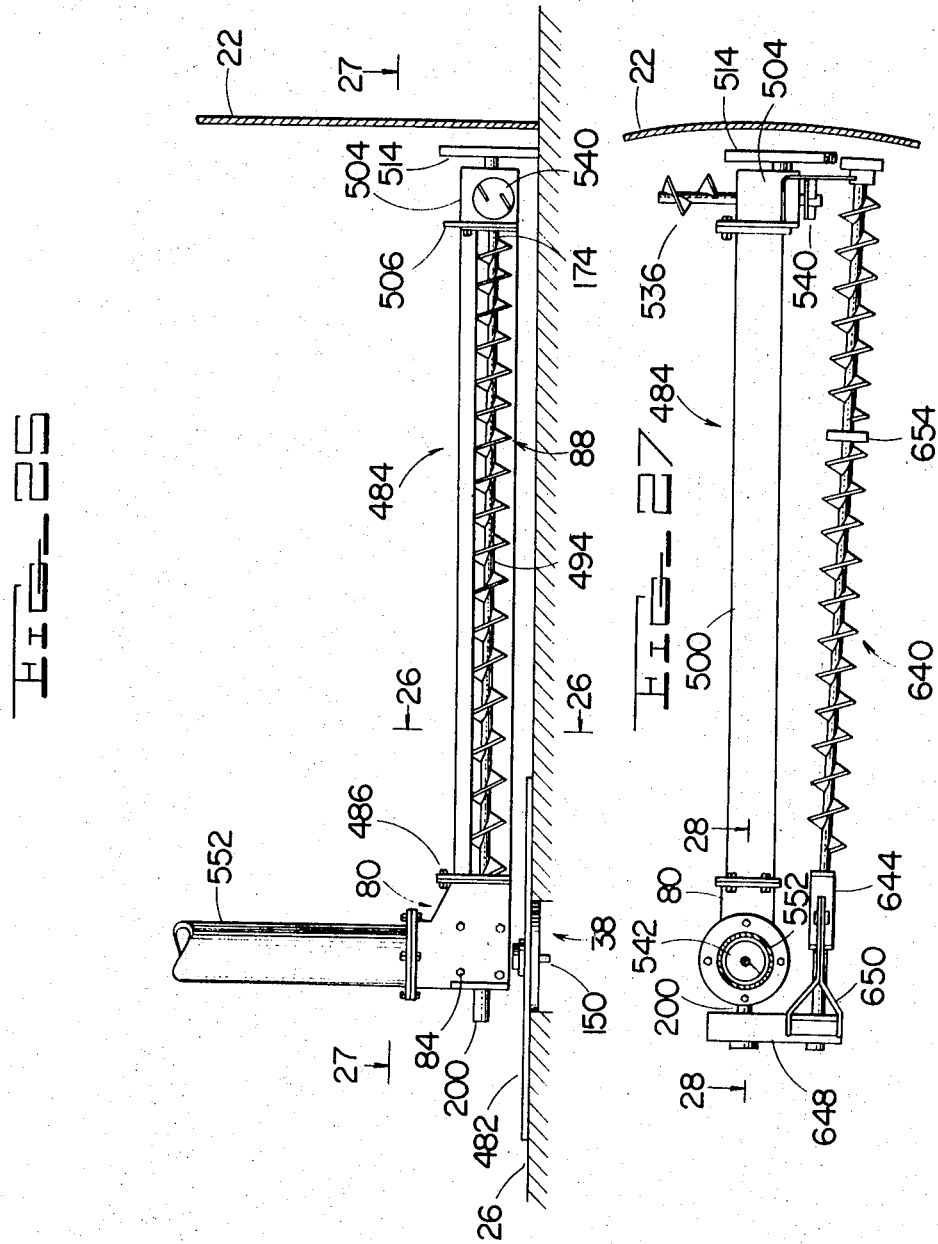

Nov. 10, 1970     C. D. NEUENSCHWANDER     3,538,618
GRAIN DRYING APPARATUS
Original Filed July 26, 1968     14 Sheets-Sheet 12
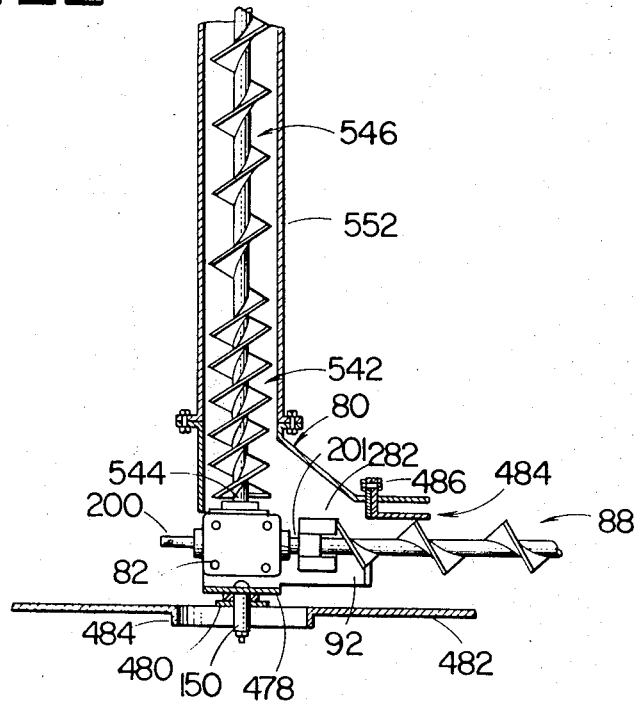
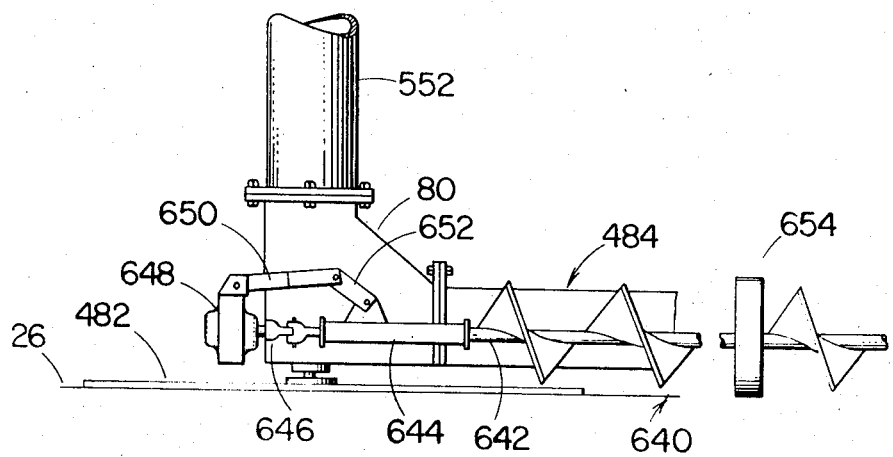
INVENTOR
CHARLES D. NEUENSCHWANDER
ATTORNEYS Nov. 10, 1970 C. D. NEUENSCHWANDER 3,538,618
GRAIN DRYING APPARATUS
Original Filed July 26, 1968 14 Sheets-Sheet 13

INVENTOR
CHARLES D. NEUENSCHWANDER

ATTORNEYS

Nov. 10, 1970  C. D. NEUENSCHWANDER  3,538,618
GRAIN DRYING APPARATUS

Original Filed July 26, 1968  14 Sheets-Sheet 14

INVENTOR
CHARLES D. NEUENSCHWANDER

Hood, Gust, Irish & Lundy
ATTORNEYS 3,538,618
GRAIN DRYING APPARATUS
Charles D. Neuenschwander, Indianapolis, Ind., assignor to Farm Fans, Inc., Indianapolis, Ind., a corporation of Indiana
Application July 26, 1968, Ser. No. 756,701, now Patent No. 3,487,961, which is a continuation-in-part of application Ser. No. 581,092, Sept. 21, 1966. Divided and this application Aug. 15, 1969, Ser. No. 850,409
Int. Cl. F26b 25/00
U.S. Cl. 34—102          14 Claims

ABSTRACT OF THE DISCLOSURE

Grain drying apparatus incorporating a drying and storage bin having a perforated floor through which heated air may flow upwardly and through the grain in the bin. A first elongated auger is provided in the bin extending over the floor adjacent thereto. The first auger is mounted at its inner end for pivotal movement in a plane generally parallel with the floor, and means are provided connected to the first auger for rotating the same about its axis in a direction to move grain toward its inner end, and for propelling the first auger to provide pivotal movement in a predetermined direction about the bin. A second elongated auger is provided in the bin with its lower end positioned adjacent the inner end of the first auger and communicating therewith, the second auger extending upwardly therefrom. Means are provided for rotating the second auger about its axis in a direction to elevate grain from its lower end toward its upped end. Distributing means is provided communicating with the second auger adjacent its upper end for distributing grain elevated thereby in the bin so that the dried strata of grain adjacent the floor of the bin is removed and redistributed over the body of grain in the bin so as to provide a continuous, recirculating flow.

BACKGROUND OF THE INVENTION

This invention relates generally to grain drying bins and drying apparatus associated therewith, and more particularly to apparatus for continuously removing grain from the floor of a bin during the drying operation thereby to reduce the drying time, prevent overdrying and increase the drying efficiency. This application is a division of my application Ser. No. 756,701, filed July 26, 1968, now Pat. No. 3,487,961, which was a continuation-in-part of my now-abandoned application Ser. No. 581,092, filed Sept. 21, 1966.

It is common practice to dry grain, such as corn, soybeans and the like, in a generally cylindrical storage bin having an apertured floor, heated air from an external source being forced upwardly through the apertures in the floor and through the grain thereover. When thus drying grain in storage bins, moisture is progressively removed in incremental strata of the grain progressing upwardly from the bottom, and thus the grain adjacent the bottom of the bin is dried before the grain on top; the grain in the upper strata will not dry until the grain in the lower strata has dried as much as the heated air passing therethrough is capable of drying it. Thus, if heated air is continuously supplied to the bin progressively to dry the grain therein from the bottom to the top, by the time the upper strata of grain has been dried, the grain at the bottom becomes overdry. In addition, the passing of heated air upwardly through the grain in the bin frequently causes the formation of a crust on the top of the moist grain at the top of the bin, which, in turn, tends to restrict the movement of air through the grain.

To avoid the overdrying condition, it has been common practice to control the temperature and humidity of the air being forced through the grain by a humidistat or similar device. Thus, when the humidity of the air which has passed through the grain has been reduced to some predetermined level, such as 70%, the burner which heats the air is turned off with the flow of air, however, continuing. When the humidity rises to a higher predetermined level, the burner is again turned on. However, during the interim the grain in the bin cools to a certain extent thus reducing efficiency. This periodic shutting off of the burner not only results in the consumption of excessive time to dry the grain, but also the consumption of excessive fuel and power for burner and blower operation.

In an effort to solve the overdrying problem, arrangements have been proposed for stirring the grain in the bin during the drying operation. However, to the best of the present applicant's knowledge, such arrangements have required substantial time to complete a cycle of removing dry grain from the bottom of the bin where the overdrying occurs and have been characterized by breakage and excessive power consumption due to the fact that they operated in high moisture grain.

The problems of excessive recirculating time, overdrying, wet and uncured spots, and top crusting can be eliminated by continuously removing the dried grain from the bottom of the bin and redistributing it on top of the grain in the bin, or transporting it to another bin, thus permitting high-moisture grain continuously to flow downwardly to the drying floor, eliminating top crusting and, in turn, eliminating the need for periodically shutting off the burner thereby retaining constant heat in the grain. By thus continuously removing the dry grain in the bin from the bottom, the grain is dried much more rapidly than with the prior controlled humidity method, thus greatly reducing the time, fuel and power required. However, no self-contained apparatus capable of installation in conventional cylindrical grain drying bins has been available or proposed for performing such a continuous removing operation.

It is accordingly an object of this invention to provide apparatus for continuously removing grain from the bottom of the storage bin and redistributing it on top of the grain therein.

Another object of this invention is to provide apparatus for continuously removing grain from the bottom of the storage bin and transporting it to another location.

In accordance with the broader aspects of the invention, apparatus for continuously removing grain from the bottom of a storage bin is provided which comprises elongated auger means in the bin extending over the floor adjacent thereto and having inner and outer ends. Means are provided for mounting the auger means at its inner end for pivotal movement in a plane generally parallel with the drying floor, and means are provided for driving the auger means in a direction to move grain toward its inner end. Propelling means are provided connected to the auger means for imparting the pivotal movement thereto in a predetermined direction while the auger means is submerged in the grain. The propelling means includes reaction means coacting with the grain in the bin responsive to applied reciprocatory motion having a vertical component for advancing the auger means in incremental steps. Means are further provided for removing grain from the inner end of the auger means.

The above-mentioned and other features and objects of this invention and the manner of attaining them will become more apparent and the invention itself will be best understood by reference to the following description of embodiments of the invention taken in conjunction with the accompanying drawings, wherein:

FIG. 1 is a side view, partly in cross section and partly broken away, showing a grain storage bin with one embodiment of the grain recirculating apparatus of the invention installed therein;

FIG. 2 is a fragmentary side view, partly in cross section and partly broken away further illustrating the apparatus of FIG. 1;

FIG. 3 is a fragmentary cross-sectional view taken generally along line 3—3 of FIG. 2;

FIG. 4 is a fragmentary cross-sectional view taken along the line 4—4 of FIG. 3;

FIG. 5 is a fragmentary side view showing a modification of the invention;

FIG. 6 is an end view of the modification shown in FIG. 5;

FIG. 7 is a fragmentary side view, partly in cross section and partly broken away, showing the addition of an unloading sweep auger to the embodiment of FIG. 1;

FIG. 8 is a fragmentary side view, partly in cross section and partly broken away, illustrating another embodiment of the invention;

FIG. 9 is a fragmentary view further illustrating the embodiment of FIG. 8;

FIG. 10 is a fragmentary cross-sectional view taken along the line 10—10 of FIG. 9;

FIG. 11 is a fragmentary cross-sectional view taken along the line 11—11 of FIG. 9;

FIG. 12 is a fragmentary cross-sectional view taken along the line 12—12 of FIG. 8;

FIG. 13 is a fragmentary side view illustrating another modification of the invention;

FIG. 14 is a fragmentary view in perspective, partly broken away, further illustrating the modification of FIG. 13;

FIG. 15 is a fragmentary cross-sectional view taken along the line 15—15 of FIG. 13;

FIG. 16 is a fragmentary cross-sectional view illustrating another embodiment of the invention;

FIG. 17 is a fragmentary side view, partly in cross section and partly broken away, illustrating a modification of the embodiment of FIG. 1;

FIG. 18 is a fragmentary view in perspective, partly broken away, illustrating the preferred form of the embodiment of FIG. 8;

FIG. 19 is a fragmentary cross-sectional view taken along the line 19—19 of FIG. 18;

FIG. 20 is a side view showing the upper portion of the preferred embodiment of the grain recirculating apparatus of the invention;

FIG. 21 is a fragmentary cross-sectional view taken generally along the line 21—21 of FIG. 20;

FIG. 22 is a fragmentary side-exploded view showing the swivel connection employed in the elevating auger tube of the apparatus of FIG. 20;

FIG. 23 is a fragmentary side view, partly in section and partly broken away, showing the connection and bearing arrangement employed for joining sections of the elevating auger tube of the apparatus of FIG. 20;

FIG. 24 is a fragmentary cross-sectional view showing the preferred form of elevating auger employed in the apparatus of FIG. 20;

FIG. 25 is a side-view showing the lower portion of the preferred embodiment of the invention, FIGS. 20 and 25 together illustrating the complete preferred embodiment;

FIG. 26 is a cross-sectional view taken generally along the line 26—26 of FIG. 25;

FIG. 27 is a top cross-sectional view taken generally along the line 27—27 of FIG. 25 and also showing the auxiliary bin sweep auger arrangement of the preferred embodiment;

FIG. 28 is a fragmentary cross-sectional view taken generally along the line 28—28 of FIG. 27;

FIG. 29 is a fragmentary side view further showing the connection of the auxiliary bin sweep auger;

Figure 30:
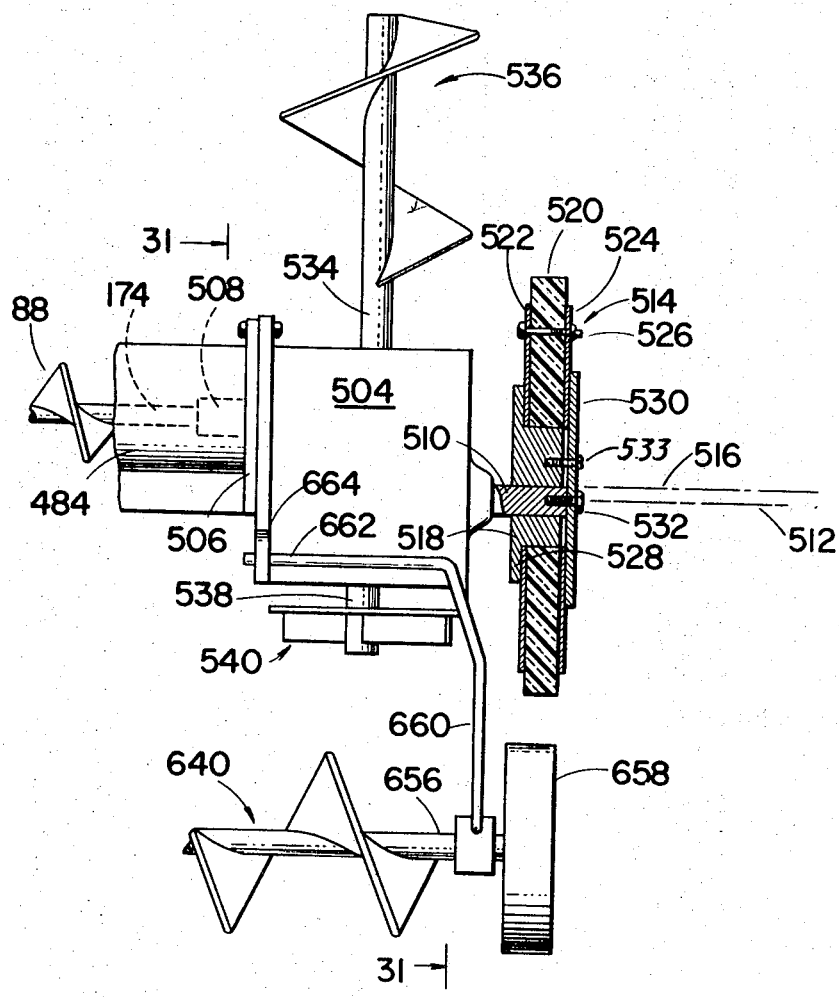
FIG. 30 is a fragmentary top view, partly in cross section, further illustrating the connection of the auxiliary bin sweep auger and showing the mounting of the eccentric wheel.
Figure 31:
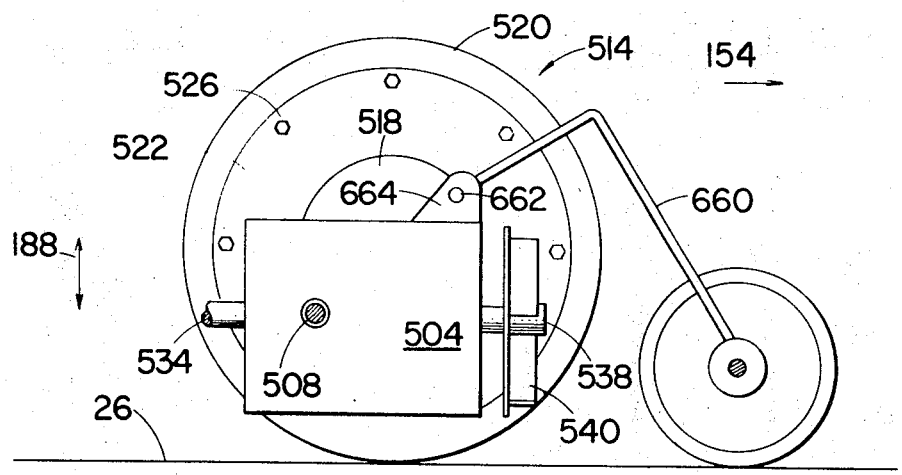
FIG. 31 is a cross-sectional view taken generally along the line 31—31 of FIG. 30.

Referring now to FIG. 1 of the drawings, there is shown a conventional metal grain storage bin, generally indicated at 20, having a generally cylindrical upstanding side wall 22 supported on a bin base 24, an apertured bottom drying floor 26 spaced above the bin base 24 to provide a plenum chamber, and a conical roof 28 having a cupola 30 through which tube 32 extends downwardly into the interior 34 of the bin for initially admitting grain thereto, as shown by the arrow 36. Heated air from external conventional heater and blower apparatus (not shown) is introduced to the plenum chamber 25 between the bin base 24 and drying floor 26 through duct 27. As the static pressure in the plenum chamber 25 increases, the heated air flows upwardly into the grain 50 in the bin through the apertures in the drying floor 26, as shown by the arrows 29. Floor 26 has a central well 38 formed therein, which may be rectangular in plan view, as best seen in FIG. 3. A conventional unloading auger assembly 40 may be provided in the space 25 having an auger tube 42 communicating between the well 38 and the exterior of the side wall 22 and an auger 44 which extends into the well 38 and is powered by an external drive motor (not shown). Auger 40 is empoyed for unloading grain from the bin 20 in the direction shown by the arrow 46.

Referring now additionally to FIGS. 2 through 4 of the drawings, the grain recirculating apparatus of one embodiment of the invention comprises a sweep auger assembly 48 for removing the bottom strata of the body of grain 50 in the bin 20 which is adjacent the drying floor 26, a central elevating auger assembly 52 for elevating the grain delivered by the sweep auger 48, and a distributing or scattering tube 54 for redistributing the thus elevated grain over the top layer 56 of the body of grain 50. The sweep auger assembly 48 has inner and outer ends 58, 60 and extends radially over the drying floor 26. A mounting and drive assembly 62 is provided for mounting the sweep auger assembly 48 at its inner end 58 for pivotal movement through 360° about the central axis 64 of the bin 20 in a plane generally parallel with the drying floor 26. Pivotal movement of the sweep auger assembly 48 is provided by cooperation of the wedge-shaped cross-sectional configuration of housing or shell 66 of the sweep auger assembly 48 and the transversely disposed propelling auger assembly 68 on the outer end 60 of the sweep auger assembly 48 as will hereinafter be more fully described.

The elevating auger assembly 52 has lower and upper ends 70, 72 and is arranged coaxially with the central axis 64. Elevating auger assembly 52 comprises an auger tube 74 which surrounds a conventional elongated auger 76 having a shaft 78. Mounting and drive assembly 62 includes a housing 80 having the lower end 70 of auger tube 74 and the inner end 58 of sweep auger housing 66 secured thereto, and it will thus be seen that in this embodiment the auger tube 74 will rotate with the pivotal motion of the sweep auger 48.

A right angle gear box 82 is positioned in the housing 80 and is secured thereto in any suitable manner, as by bolts 84. Elevating auger 76 has a lower extremity 86 extending into the housing 80 and drivingly secured to the input shaft of the gear box 82. Sweep auger assembly 48 includes an auger 88 within housing 66 and having a shaft 90. Auger 88 has an inner end 92 extending into housing 80 and drivingly connected to one of two output shafts of the gear box 82. In this embodiment, the sweep auger 88 is of the graduated type, i.e., with the spacing of its flites progressively increasing from its outer end 60 to its inner end 58. It will be seen that housing 80 provides a channel communicating between inner end 92 of sweep auger 88 and lower end 86 of elevating auger 76 for conveying grain thereto.

Shaft 78 of elevating auger 76 has an upper end 94 which extends upwardly above the upper end 72 of the auger tube 74 and which has a conventional scattering disc 96 and a sheave 98 secured thereto, scattering disc 96 being above the sheave 98. A mounting bracket 100 is secured to the upper end 72 of the auger tube 74, as by welding, and supports a bearing 102 for the elevating auger shaft 78. A motor mounting bracket 104 is pivotally connected to the mounting bracket 100 with a conventional electric motor 106 in turn mounted thereon. Motor 106 has a pulley 108 on its shaft drivingly coupled to sheave 98 by a conventional V-belt 110.

It will now be seen that energization of motor 106 will drive the elevating auger 76 and in turn drive the sweep auger 88 through gear box 82, the direction of rotation of the elevating and sweep augers 76, 88 being such that grain is moved inwardly from outer end 60 toward inner end 58 of the sweep auger, as shown by the arrow 112 and into housing 80 where it is picked up by the lower end 86 of the elevating auger 76 and elevated in the auger tube 74 in the direction shown by the arrow 114. Distributing tube 54 has its inner end 116 connected to the elevating auger tube 74 and communicating therewith, and extends radially outwardly therefrom. Distributing tube 54 has a plurality of axially spaced-apart apertures 118 formed in its lower side and thus, grain elevated by the elevating auger assembly 52 is fed to the distributing tube 54, flowing downwardly and outwardly therein in the direction shown by the arrow 120, and being scattered through the apertures 118 on top of the body 50 of grain as shown by the arrows 122. It will be readily seen that the distributing tube 54 rotates with the elevating auger tube 74, and in turn with the pivotal motion of the sweep auger 48, the distributing tube 54 preferably being in vertical alignment with the sweep auger assembly.

Mounting bracket 100 has a pair of rails 124 secured thereto and extending outwardly therefrom on the side opposite motor 106. A vertical post 126 is adjustably secured to rails 124 for movement thereon toward and away from the axis 64. A funnel 128 is provided disposed under the cupola 30 and the inlet tube 32, funnel 128 being mounted for vertically adjustable movement on post 126 by bracket 130. It will thus be seen that grain introduced into the bin through the inlet tube 32 is directed into the funnel 128 and thence onto the scattering disc 96, which in turn scatters the grain around the bin. The best scattering operation is provided when the funnel 128 remains partially full of grain, and thus the vertically adjustable positioning of funnel 128 by means of bracket 130 on post 126 is provided in order to adjust the proper vertical position of the funnel 128 above the scattering disc 96 for the rate of flow of grain being admitted through inlet 32 in order to maintain the funnel 128 partially full. The outer end 132 of the scattering tube 54 is supported by means of a chain, cable, or the like, 134 attached to bracket 130, as shown.

It will be observed that motor 106 being mounted on elevating auger tube 74 by means of brackets 100, 104 will rotate with auger tube 74, and therefore, in order to supply power to the motor 106, a two-part slip ring connector assembly 136 is provided on the auger tube 74. Assembly 136 comprises an upper part 138 secured to the auger tube 74 and rotatable therewith, electrical leads 140 coupling the rotatable slip ring part 138 to the motor 106. Stationary part 142 of the slip ring assembly 136 has a suitable electrical lead 144 connected thereto and adapted to be connected to a suitable source of power for the motor 106. A suitable bracket 146 is secured to the stationary part 142 of the slip ring assembly 136, as by welding, and is anchored to the side wall 22 of the bin 20 by a plurality of radially extending chains, cables or the like 148 which not only restrain the stationary slip ring assembly part 142 from rotation, but also support and locate the upper end of the elevating auger assembly 52. The lower end of the elevating auger assembly 52 is supported and located by means of a pivot post 150 extending downwardly from the gear box 82 and pivotally supported in a suitable bearing or floor bracket 152 mounted on the bottom of the well 38.

The transverse propelling auger assembly 68 is operatively connected to and driven by the outer end of the sweep auger 88 and in conjunction with the cross-sectional wedge-shaped configuration of the sweep auger housing 66 functions to impart pivotal motion to the sweep auger assembly 48 in the direction shown by the arrow 154 in FIGS. 3 and 4. Referring now particularly to FIG. 4, housing 66 of the sweep auger assembly 48 has an elongated front wall 156 facing the direction of movement 154 and an elongated rear wall 158 having its upper extremity joined to the upper extremity of the front wall 156 and being inclined downwardly and rearwardly therefrom, the front and rear walls 156, 158 thus forming an inverted generally V-shaped wedge configuration as best seen in FIG. 4. The lower edge 160 of the front wall 156 is spaced from the drying floor 26 thereby providing an elongated front opening 162 which exposes the sweep auger 88 to the body of grain 50 in the bin. A part-cylindrical member 164 extends between the lower edge 160 of the front wall 56 and the rear wall 158 thereby defining an auger tube for the sweep auger 88 so as to move grain inwardly in the direction of the arrow 112. In the illustrated embodiment, housing 66 also includes an elongated bottom wall 166 joined to the bottom edge 168 of the rear wall 158 and inclined forwardly and downwardly therefrom to a front edge 170 which is closely adjacent but not in scraping engagement with drying floor 26.

The transverse propelling auger assembly 68 includes a right angle gear box 172 secured to the outer end 60 of sweep auger housing 66 and having its input shaft drivingly connected to the outer end 174 of sweep auger 88. Gear box 172 has two oppositely extending output shafts 176, 178 having short auger sections 180, 182 secured thereto which tend to propel the sweep auger assembly 48 in the direction shown by the arrow 154. Auger sections 180, 182 each have a cam 184, 186 thereon which engage the drying floor 26 each revolution of the auger sections 180, 182 thus providing a vertical reciprocatory motion to the sweep auger assembly 48 as shown by the arrows 188 in FIG. 4. Cams 184, 186 may be phased 180° apart so that each revolution of the shafts 176, 178 provides two upward and downward movements of auger assembly 48.

It will now be seen that the weight of the body of grain 50 in the bin, shown by the arrow 189 exerts a downward force on the upwardly sloping rear wall 158 of the wedge-shaped housing 66, this force being resolvable into vertical and horizontal components, as shown by the arrows 191. It will further be seen that rotation of auger 88 will cause the grain in front of the front wall 156 continuously to flow downwardly and into opening 162, as shown by the arrows 193, the grain entering opening 162 being removed by auger 88 toward inner end 58. This removal of grain from in front of and underneath housing 66 reduces the rearwardly acting force exerted by the body of grain 50 against front wall 156 which normally resists movement of the housing 66 and sweep auger 88 in the direction 154. Thus, each time the sweep auger assembly is moved upwardly, the horizontal component 191 of the downward force exerted by the weight of the grain on rear wall 158 will cause the auger assembly to advance in direction 154 an incremental amount by virtue of the relief of the rearwardly acting force of the grain on the front wall 156, as above described. Likewise, as the sweep auger assembly moves downwardly, the horizontal component 191 of force exerted by the grain on rear wall 158 will cause the assembly to advance forwardly another incremental step by reason of the continuous removal of grain from in front of and underneath the housing, thus reducing the force resisting forward movement.

Thus, in this embodiment, the combined propelling forces exerted by transverse auger sections 180, 182, and the vertical reciprocatory motion 188 in conjunction with removal of grain from in front of and under housing 66 result in propulsion of the sweep auger assembly 48 in the direction 154, the principal propelling force however being that provided by the reciprocatory motion and force relieving action which results in the imparting of the pivotal motion to the sweep auger 48 with the employment of far less power than would be required if the sweep auger were merely moved through the body of grain by sheer brute force.

In the illustrated embodiment, a vertically adjustable damper plate 190 is adjustably secured to the front wall 156 of housing 66 and having its lower edge 192 selectively restricting the height of the opening 162. It will be observed in FIG. 2 that the bottom edge 192 of the damper plate 190 is tapered upwardly from the outer end 60 to the inner end 58 of the sweep auger assembly in order to provide an opening of progressively increased height. This graduated opening together with the provision of the graduated auger 88 permits the auger to pick up grain along its entire length; totally exposed augers tend to fill themselves entirely and thus only pick up additional material at their outer end.

Referring now briefly to FIGS. 5 and 6 of the drawings, the vertical reciprocatory motion may be imparted to the sweep auger assembly 48 by an eccentric wheel 194 operatively connected to the outer end 174 of the sweep auger 88 by means of a suitable gear box 196 secured to the outer end of the housing 66. While the eccentric wheel 194 is driven by the sweep auger 88 and may at times drivingly engage the drying floor 26 it should be understood that the propelling force exerted on the sweep auger assembly 48 is not the sole result of the driving engagement of the wheel 194 with the drying floor 26. In fact, the eccentric wheel 194 does not continuously drivingly engage the drying floor 26 but will slip much of the time as the sweep auger assembly 48 reciprocates vertically, the principal forward propelling force again resulting from the vertical reciprocatory and rearward force relieving action rather than from driving engagement of eccentric wheel 194 with the drying floor 26. It will be readily understood that a concentric wheel having one or more projections thereon may also be employed for imparting the vertical oscillatory motion to the sweep auger assembly 48.

Referring now to FIG. 7 of the drawings it will be understood that the recirculating apparatus of the invention thus far described may be employed rapidly to unload grain from the bin. Operation of the unloading auger 40 will remove grain from the well 38 as rapidly as it is conveyed thereto by the sweep auger 48 and thus little, it any, grain will be elevated by the elevating auger 52 and distributed by the distributing tube 54. Thus, when a load of grain in the bin 20 has been fully dried, continued operation of the recirculating apparatus in conjunction with operation of the unloading auger 40 will result in the sweep auger 48 being pivotally moved around the bin thereby conveying grain to the well 38 where it is picked up and removed by the unloading auger.

In order to facilitate more rapid sweeping of the bin near the end of the unloading operation, an open sweep auger 198 is provided which may be removably attached to the normally unused stub shaft 200 on the gear box 82. The unloading sweep auger 198 has a shaft 202 which is drivingly connected to the output stub shaft 200 of the gear box by a universal joint 204 which thus permits pivotal motion of the sweep auger 198 as shown by the arrows 206. Motion of the unloading sweep auger 198 is, however, limited by a pivoted support bracket assembly 208 connecting the sweep auger 198 to the housing 80, as at 210.

Thus, when unloading of the bin has proceeded to the point where the grain will no longer flow by gravity into the well 38 and the stub shaft 200 thus becomes exposed, then the unloading sweep auger 198 can be connected thereto. Continued operation of the apparatus including the sweep auger 198 will thus increase the rate of feeding grain to the well 38 so that the final sweeping of grain from the bin is more rapidly accomplished.

Referring now to FIGS. 8 through 12 of the drawings, in which like elements are indicated by like reference numerals, another embodiment of the invention is shown, generally indicated at 212. In this embodiment, an open sweep auger 214 is provided having inner and outer ends 216, 218. Auger 214 has a shaft 220 and is shown as being of the tapered type, i.e., with its flites equally spaced but with its diameter progressively increasing from its outer end 218 to its inner end 216. An elevating auger assembly 224 is provided having lower and upper ends 226, 228, elevating auger assembly 224 including an auger 230 having a shaft 232 and an auger tube 234 surrounding auger 230. A plate member 235 is secured to the upper end 228 of elevating auger tube 234 and has a bearing 236 thereon which supports shaft 232 of auger 230. Shaft 232 has an extension portion 238 which extends upwardly above plate 235 and bearing 236. A conventional scattering disc 240 is secured to the extension portion 238 of auger shaft 232 and is disposed under funnel 128, as shown. Another distributing scattering disc 242 is provided spaced downwardly from the plate member 235 and coaxially surrounding auger tube 234. Scattering disc 242 is connected to and drives scattering disc 240 by a plurality of post members 244. A plurality of openings 246 are formed in the auger end 228 of the auger tube 234 communicating with the distributing scattering disc 242. Thus, grain elevated by the elevating auger 230 spills out of the openings 246 in the upper end 228 of the auger tube 234 onto the distributing scattering disc 242. A suitable V-belt sheave 248 is secured to the bottom side of the distributing scattering disc 242 and is driven by V-belt 110, which in turn is driven by pulley 108 of motor 106. In this embodiment, the mounting bracket 100 which supports motor 106 and funnel 128 is secured to the auger tube 234 below the upper end 228, as shown in FIG. 8.

In this embodiment, the auger tube 234 does not rotate with pivotal movement of the sweep auger 214, and thus the two-part slip ring assembly 136 of the embodiment of FIG. 1 may be dispensed with. Here, a suitable bracket 250 is provided secured to the auger tube 234 and connected to the side wall 22 of the bin 20 by suitable chains or cables 252 which thus support the upper end 228 of the elevating auger 234 and prevent rotation thereof.

The lower end 254 of shaft 232 of elevating auger 230 projects downwardly from the lower end 226 of elevating auger tube 234 and is operatively connected to input shaft 256 of gear box 258. Gear box 258 has two stub output shafts 200, 260 with the inner end 262 of shaft 220 of the sweep auger 214 being operatively connected to the stub output shaft 260. The other stub shaft 200 may have an unloading sweep auger coupled thereto as described and as shown in FIG. 7. Gear box 258 is supported and located by pivot post 150 seated in a suitable bearing or floor bracket 152 mounted on the bottom of the well 38.

Gear box 258 is rotatably connected to the bottom end 226 of auger tube 234 by means of a sleeve member 264 rotatably mounted on the bottom end 226 of auger tube 234 and having a pair of transversely spaced-apart bracket members 266, 268 secured thereto and depending therefrom to which the gear box 258 is secured, as by bolts 270. It will be observed that the bottom end 272 of the elevating auger 230 extends downwardly into the space 274 between the two-bracket members 266, 268, the bracket members 266, 268 thus forming a channel for conveying grain from the inner end of the sweep auger 214 to the bottom end of the elevating auger 230.

A conical shield 276 is provided secured to an annular flange member 278 which in turn is secured to the lower end 226 of the auger tube 234 immediately above the sleeve member 264. A plurality of rollers 280 are rotatably secured to the sleeve member 264 and bracket members 266, 268 and engage the lower side of the flange member 278 thereby to facilitate rotary motion of the sleeve member 264, bracket members 266, 268 and gear box 258 with respect to the auger tube 234. It will be observed that the gear box 258, sleeve member 264 and bracket members 266, 268 will rotate with a pivotal movement of the sweep auger 214, whereas, as indicated above, the elevating auger tube 234 remains stationary in this embodiment.

A plurality of grain throwing blades 282 are secured to the inner end 262 of sweep auger shaft 220, blades 282 tending to throw the grain moved inwardly by the sweep auger upwardly into the channel 274 between the bracket members 266, 268 so that it will be picked up and moved upwardly by the elevating auger 230. It will be observed that in both the embodiment of FIG. 8 and the embodiment of FIG. 1, when the unloading auger 40 is not operated, the well 38 will initially fill with grain which spills therein around the sides with the result that the grain moved inwardly by the sweep auger will be readily advanced so as to be picked up by the bottom end of the elevating auger.

The conical shield 276 extends downwardly over the gear box 258 and the grain-throwing blades 282 and extends sufficiently outwardly over the inner end 216 of the sweep auger 214 so as to prevent grain from flowing by gravity into the grain passage 274 defined between the bracket members 266, 268. Thus, the only grain permitted to reach the lower end 272 of the elevating auger 230 is that conveyed thereto by the sweep auger 214. The upper extremity of shield 276 also protects the sleeve member 264 and rollers 280 keeping grain away therefrom thereby permitting free rotation of the sleeve member gear box assembly.

In this embodiment, the conical shield 276 may be extended, if desired, to a point closely spaced from floor 26, as shown by dashed lines 277, leaving an opening 279 for sweep auger 214, and if desired another opening (not shown) with a removable cover plate for unloading sweep auger 198. With such an arrangement, grain is prevented from flowing into well 38 and thus, the only grain reaching well 38 would be that conveyed thereto by sweep auger 214, and when used, unloading auger 198. Thus, dried grain may be continuously removed by the underfloor unloading auger 40 rather than being elevated and rescattered in the same bin.

The outer end 284 of shaft 220 of sweep auger 214 receives and is secured to a shaft 286 which has a cylindrical cam 288 eccentrically secured thereto. Another cylindrical cam 290 is provided axially spaced from cam 288 and has shaft 292 eccentrically secured thereto, shafts 220, 286 and 292, however, being coaxial. A shaft 294 connects the two cams 288, 290 and is coaxial therewith, shaft 294 thus being eccentric with respect to shafts 220, 286, and 292. A wheel 296 is secured to shaft 292 and rotates therewith and, therefore, with the sweep auger shaft 220, wheel 296 drivingly engaging the drying floor 26 adjacent the side wall 22 of the bin in a slipping relationship as above-described in connection with FIGS. 5 and 6. A short section 298 of auger is mounted on the eccentric shaft 294 between the two cylindrical cams 288, 290.

A quiver board 300 is provided over the cams 288, 290 and the eccentric auger 298, quiver board 300 being mounted on the cams 288, 290 by bearings 302, 304. Quiver board 300 has a flat wall 306 which is inclined upwardly and forwardly in the direction of pivotal movement 154 of the sweep auger 214. A short flange, or lip, 308 is joined to the upper extremity of the member of 306 and extends downwardly and forwardly therefrom so as to define an inverted generally V-shaped wedge configuration. A foot member 310 is provided which bears against the drying floor 26 and is secured to the flat member 306 at its rear edge 312 by a rod 314.

It will now be seen that as the sweep auger 214 is revolved by the gear box 258, auger section 298 will remove grain from in front of and under the quiver board 300, thus relieving the rearwardly acting force otherwise exerted by the grain on the bottom surface of plate member 306 which would tend to resist forward movement in direction 154. Eccentric cams 288, 290 simultaneously apply a reciprocatory motion to the quiver board 300 which has a vertical component as shown by the arrows 316. Thus with the downward pressure of the grain in the bin being exerted on the upper surface of the plate member 306 and the foot member 310 engaging the drying floor 26, and with the grain being removed from in front of and under the quiver board, a prying action is exerted between the drying floor and the grain in the bin with the result that the horizontal component of the downward force exerted by the grain on the quiver board tends to propel the sweep auger 214 in its pivotal motion in the direction shown by the arrow 154.

It will be observed that the torque injected into gear box 258 by rotation of elevating auger shaft 232 tends to impart pivotal motion to sweep auger 214 since the gear box and sweep auger are pivotally mounted with respect to the power source. However, the mass of grain in the bin (and even with the bin empty, the inertia of the sweep auger assembly 214) provides a force resisting this pivotal movement so that gear box 258 rotates sweep auger shaft 220 through differential action. Thus, power is applied by elevating auger shaft 230 both to pivotally rotate gear box 258 and sweep auger 214, and through gear box 258 to rotate sweep auger shaft 220. Due to the restraining forces referred to, sweep auger shaft 220 rotates more easily, however, there is still a constant force exerted tending pivotally to rotate the entire assembly of gear box 258 and sweep auger 214 about the axis 64.

Thus, in this embodiment, the principal propelling force for the sweep auger 214 results from a combination of the reciprocatory motion of the quiver board 300 with the accompanying grain removal action of auger section 298, and the pivotal torque exerted on the sweep auger and gear box assembly above-referred to. While the wheel 296 is shown as directly driven by the sweep auger shaft 220, it may be freely rotatably mounted on shaft 292. Further, while wheel 296 normally engages the drying floor 26, it will, even when driven by the sweep auger shaft, at the most have only a slipping engagement with the floor and, further, since the wheel is totally submerged in the grain, it will at times leave the drying floor by as much as two inches. Thus, little, if any, propelling force for the sweep auger 214 is provided by the wheel 296.

Referring now to FIGS. 13, 14 and 15 of the drawings, it may be desirable in the case of the embodiment of FIGS. 1-4 to provide for ready removal of the damper from its position restricting the auger opening for more rapid sweeping of the drying floor during unloading of the grain from the bin, and also to provide for ready selective adjustment of the opening defined by the damper. In this embodiment in which like elements are indicated by like reference numerals, the sweep auger assembly 48 includes two housing sections 318, 320 joined together by suitable flanges and threaded fasteners 322, 324. Each of the housing sections 318, 320 comprises a rear wall 326 inclined upwardly and forwardly in the direction of pivotal movement 154. A front wall 328 is provided having its upper extremity joined to the upper extremity of the rear wall 326 thereby to define an inverted generally V-shaped wedge section. The lower edge 330 of the front wall 328 is spaced from the drying floor 26 thereby to expose the auger 332 within the housing. The lower portion of the rear wall 326 is curved downwardly and forwardly, as at 334 terminating in edge 170 which is adjacent the drying floor 26, portion 334 thus forming a part of the tube for the auger 332. An inner part-cylindrical wall 336 joins the front wall 328 and the rear wall 326 to form yet another part of the tube for the auger 332.

In this embodiment, the damper is divided into two sections 338, 340 respectively generally coextensive with the housing sections 318, 320. Dampers 338, 340 are normally disposed in front of the front wall 328 with their lower edges 342 partially restricting the opening 344 which communicates with the auger 332. As in the case of the embodiment of FIGS. 1 and 2, the bottom edges 342 of the dampers 338, 340 are tapered upwardly from the outer end 60 to the inner end 58 of the sweep auger 48, as best seen in FIG. 13.

Each of the damper plates 338, 340 is mounted for selectively adjustable vertical movement by means of slotted bracket members 346, the damper plates being adjustably secured to the bracket members 346 by suitable threaded fasteners 348. Each of the bracket members 346 is secured to a pivot rod 350 which is pivotally supported by a suitable bearing member 352. Each of the bearing members 352 is in turn secured to a bearing member 354 which is secured to an elongated shaft 356 journaled in flanges 322 which join the housing sections 318, 320 and in the respective outer and inner flanges 358, 360. A manual actuating lever 362 is secured to the shaft 356 adjacent inner end 58 of the sweep auger assembly 48.

It will now be readily been that by virtue of the pivotal mounting of the damper plates 338, 340 through bracket members 346, rods 350 and bearing members 352, the damper plates 338, 340 may be manually pivotally rotated away from the front wall 328, as shown by the arrow 364, thereby to expose the entire opening 344 for the final sweeping operation during unloading of the bin. It will further be seen that the bearing members 352 are secured to the bearing members 354 in eccentric fashion and thus that manual rotation of the lever member 362 in the direction shown by the arrow 366 will result in vertically lifting the damper plates 338, 340 in the direction shown by the arrow 368 thereby to provide selective vertical adjustment of the damper plates between lower and upper effective positions.

While a graduated auger 88 has been shown in the embodiment of FIG. 1 and a tapered auger in the embodiment of FIG. 8, use of a damper plate or plates having a tapered lower edge as shown in FIGS. 2 and 13 will permit the employment of an ungraduated auger, i.e., an auger having uniform spacing between its flites as shown in FIG. 13.

In the embodiments described above in connection with FIGS. 1 through 4, and FIGS. 5 and 6, the vertical reciprocatory motion of the sweep auger 48 is provided by eccentric means driven by the auger, i.e., the cams 184, 186 mounted on the auger sections 180, 182 in the embodiment of FIGS. 1 through 3, and the eccentric wheel 194 in the embodiment of FIGS. 5 and 6. Referring now to FIG. 16, in which like elements are indicated by like reference numerals, the reciprocatory motion may be imparted to the sweep auger housing 370 by means of an elongated shaft 372 extending between the rear and front walls 374, 376 parallel with shaft 378 of auger 380. Shaft 372 is operatively coupled to the gear box 82 and driven thereby and has a plurality of axially spaced-apart cams 378 thereon which engage the inner surface of the rear wall 374 of the housing 370. In this embodiment, housing 370 is pivotally mounted on shaft 378 of the sweep auger 380 and thus, rotation of shaft 372 with cams 378 thereon will cause a pivotal motion of housing 370 about the axis of the sweep auger shaft 378, as shown by the arrow 382, thus a movement to rear wall 374 which has a vertical reciprocatory component.

Referring now to FIG. 17, there may be installations in which an under-the-floor unloading auger 40 is not installed, or in which it is desirable to unload the bin into an elevated discharge pipe so as to remove dried grain from the bin to some other location rather than to redistribute it in the same bin. Here, with like elements being indicated by like reference numerals, a swivel joint 384 is provided adjacent the upper end 72 of the elevating auger tube 74, swivel joint 384 connecting auger tube 74 to an upper auger tube extension 386. A cylindrical distributing tube 388 is provided having axially spaced-apart distributing openings 390 formed in its side wall. The inner end 39 of the distributing tube 388 is rotatably connected to tube 398 joined to the auger tub extension 386. Distributing tube 388 thus extends radially outwardly from the auger tube extension 386 toward the side wall 22 of the bin and is supported by means of the chain, or cable, 134.

An unloading tube 400 is provided extending through the side wall 22 into the interior of the bin 20 and has a tapered inner end 402. Supporting chain, or cable, 134 rotatably supports the distributing tube 388 by means of a ring 404 within which the distributing tube 388 may be rotated. It will now be seen that during the recirculating operation, the distributing tube 388 is disposed as shown in solid lines in FIG. 17 with its distributing openings 390 facing downwardly thereby to distribute the grain elevated by the elevating auger 52 on top of the grain in the bin. When, however, it is desired to unload the bin, the distributing tube 388 is rotated on the tube 398 until the openings 390 are facing upwardly and, by virtue of a loose connection of the end 396 of the distributing tube 388 to tube 398, the tube is manually raised with its outer end 394 resting in the tapered end 402 of the unloading tube 400, as shown in dashed lines. With this arrangement, operation of the drive motor 106 (FIG. 1) resulting in pivotal motion of the sweep auger assembly 48 and operation of the elevating auger assembly 52 will result in the sweeping of grain from the bottom of the bin, elevation of the grain in the elevating auger 52, and discharge of the grain through the distributing tube 388 into the unloading tube 400.

It will be readily understood that the swivel connection 384 is required in the embodiment of FIG. 17 to permit the extension auger tube 386 and the distributing tube 388 to remain stationary when in their unloading positions despite the sweeping action of the sweep auger 48 and accompanying rotation of the elevating auger tube 74 as above-described.

Referring now to FIGS. 18 and 19 in which a preferred modification of the embodiment of FIG. 8 is shown, and in which like elements are again indicated by like reference numerals, the end of the shaft 220 of sweep auger 214 of FIG. 8 is extended beyond end 218 of the sweep auger, as at 404, and has wheel 296 secured thereto. A pair of suitable sealed bearings 406, 408 are provided in axially spaced-apart relationship and rotatably support tubular sleeve 410. Sleeve 410 has an inside diameter greater than the outside diameter of shaft extension 404 which extends through sleeve 410. A shim 412 is secured between sleeve 410 and shaft extension 404, as by welding, and it will thus be seen that the axis 414 of shaft extension 404 and sweep auger 214 is eccentric and parallel with respect to the axis 416 of sleeve 410.

A quiver box 418 is provided comprising a top plate member 420 having forward and rear ends 422, 424 and side edges 426, 428 which diverge or taper outwardly and forwardly from rear end 424 toward front end 422. Top plate member 420 is inclined forwardly and upwardly from rear end 424 to forward end 422 over the bearings 406, 408 and sleeve 410 in the direction of pivotal movement 154 of sweep auger 214. Top plate member 420 is secured to bearings 406, 408 by brackets 430, 432, which are respectively secured to the bearings and to top plate member 420, as by threaded fasteners 434. Top plate member 420 has a depending flange portion 436 formed on its forward edge 422.

A bottom plate 438 is provided having forward and rear ends 440, 442 and side edges 444, 446. Bottom plate 438 is generally rectangular, being wider than rear end 424 of top plate 420, and rear end 442 extends rearwardly of rear end 424 of top plate 420 to form a stabilizer section 448. Bottom plate 438 preferably has an axially short front section 450 joined to rear section 452 by inclined section 454. A front wall 456 joins top and bottom plates 420, 438 rearwardly of the bearings 406, 408, extending transversely between side edges 426, 444 and 428, 446. Side walls 458, 460 respectively join side edges 426, 428 of the top plate 420 to bottom plate 438, and rear wall 462 joins rear end 424 of top plate 420 to stabilizer section 448 of bottom plate 438.

Bottom plate 438 is maintained in generally spaced parallel relationship with the drying floor 26 by the action of stabilizer section 448 in the body of grain 50. It will thus be seen that top plate 420 is inclined upwardly and forwardly in the direction of pivotal movement 154 with respect to the drying floor 26 and that the box formed by top plate 420, front wall 456, side walls 458, 460, rear wall 462 and bottom plate 438 is also tapered outwardly and forwardly in direction 154. Thus the quiver box 418 has a two dimensional taper or wedge-shaped configuration.

In this embodiment, the short auger section 464 preferably is formed by a section of relatively large diameter wire helically wrapped on sleeve 410 between bearing 406, 408 and welded thereto. It will now be seen that the stabilizer section 448 of bottom plate 438 acts as a foot in the grain 50 in the bin thus preventing rear edge 442 from moving upwardly or downwardly by any substantial amount. When the short auger section 464 is rotated by rotation of the sweep auger 214, grain will be removed from front wall 456 under top plate 420, flowing around and under bearings 406, 408. Bearings 406, 408 on sleeve 410 which is eccentric with respect to the axis 414 of shaft extension 404 and shaft 220 of sweep auger 214 will impart a reciprocatory motion having a vertical component to the top plate 420, as shown by the arrows 466. This reciprocatory motion of the top plate 420 results in a downward prying action being exerted by the bottom plate 438 against the grain. Thus, by virtue of the removal of the rearwardly acting force exerted by the grain on the front wall 456 by rotation of the short auger section 464, the reciprocatory, prying action exerted by bottom plate 438, and the two-dimensional tapered configuration of quiver box 418, horizontal component of the downward force extended by the grain on the quiver box 418 causes it to tend to move forwardly in the direction shown by the arrow 154. This forward force resulting from the reciprocatory motion of the quiver box 418, together with removal of grain forwardly and under the quiver box, combined with the pivotal torque extended on the sweep auger 214, as above-described, provides the pivotal propelling force for the sweep auger 214.

While a single sweep auger has been shown in each of the embodiments of the invention, with the optional addition of a skeleton open auger 198 for facilitating sweeping of the bin during the final stages of an unloading operation, it will be readily understood that a second recirculating sweep auger assembly 48, 214 identical to those described and illustrated may be provided permanently connected to the gear box 82, 258 since a second stub output shaft 200 is readily available in each embodiment. It will further be readily understood that three or more sweep augers may be provided, if desired, by modification of the gear box to provide the requisite number of output shafts. The use of two or more recirculating sweep augers (in contrast with the optional unloading sweep auger 148) may be found desirable in the case of large bins.

In an actual installation of the recirculating apparatus of the type illustrated in FIGS. 8 and 18, 19 in a corn bin having a diameter of 24 feet and accommodating 7,000 bushels of corn, the sweep auger 214 was 10 feet, 5 inches long with its diameter tapering from 2 inches at its outer end 218 to 3 inches at its inner end 216. Quiver box 416 was 11 inches long (in the direction of sweep auger 214) and 9 inches wide (from front edge 422 to rear edge 442), the short auger section 464 was 9½ inches long with a diameter of 2 inches, sleeve 410 having a diameter of 1⁵⁄₁₆ inches, and the eccentricity of axis 416 of the short auger 464 and bearings 406, 408 was ⅛ inch. Vertical auger 224 was 25 feet high and six inches in diameter. With this arrangement, employing a two-horsepower, 220-volt single phase motor 106 with the elevating auger operated at a speed of 438 r.p.m. and the speed of sweep auger 214 reduced by gear box 258 by a ratio of 1.35 to 1, sweep auger 214 was found to make one complete revolution in one and one-half hours with the motor 106 drawing approximately 10 amperes.

Operation of the sweep auger at a lower speed than the elevating auger was found to be desirable in an installation having only a single sweep auger since the sweep auger is capable of moving grain to the center at a faster rate than it can be elevated by the elevating auger. It will be readily understood that the gear box 82, 258 may incorporate an adjustable variable speed drive in order selectively to control the sweep auger rotational and pivotal speeds for the best drying action. With the grain recirculating apparatus of the invention, it has been found that up to four times as much grain can be dried in a given time under like conditions, i.e., grain moisture, outside air humidity, drying air velocity and temperature, etc., compared with the previous method of drying grain in storage bins involving merely controlling operation of the heater in response to humidity.

Referring now to FIGS. 20 through 31 which show the preferred embodiment of the invention, and in which like elements are indicated by like reference numerals, and particularly to FIGS. 20 and 25 which together show the preferred embodiment installed in the grain bin 20, in this embodiment, a separate scattering device 470 is secured to the roof 28 within the bin directly under the center opening 472. Scattering device 470 includes a funnel portion 474 which receives the grain from the inlet 32 and directs it downwardly onto the inclined scattering disc 476 which is driven by a suitable motor (not shown) within the funnel 474. A suitable scattering assembly is shown and described in my copending application Ser. No. 688,789. Rotation of the scattering disc 476 scatters grain in the bin thus to form the body of grain 50 (FIG. 1).

The sweep auger 88 is of the graduated type having the axial spacing between its flites progressively increasing from its outer end 174 to its inner end 92. Inner end 92 of the sweep auger 88 is connected to one of the output shafts 201 of the right angle gear box 82. Gear box 82 is mounted in housing 80, as by suitable bolts 84. Pivot post 150 extends downwardly from transverse member 478 of housing 80 and is rotatably seated in transverse portion 480 of bracket member 482. Bracket member 482 has a downwardly turned flange portion 484 which is seated in the well 38 in the floor 26.

Sweep auger housing or shell 484 has its inner end 486 connected to housing 80 and communicating therewith, inner end 92 of the sweep auger 88 extending into the housing 80, as best seen in FIG. 28. Referring particularly to FIG. 26, in the preferred embodiment, sweep auger housing 484 comprises a semicylindrical back wall 488 closely spaced from the outer periphery of the sweep auger 88 and generally coaxial with shaft 90, the semicylindrical back wall 488 having a lower extremity 490 and an upper extremity 492 mutually defining the front opening 494 which exposes sweep auger 88 to the grain in the bin. Front wall 496 extends generally vertically upwardly from the forward extremity 492 of the back wall 488 and has a forwardly extending flange 498 formed at its upper extremity. Rear wall 500 has its forward extremity joined to the flange 498 and its rear extremity 502 joined to the back wall 488 intermediate its extremities, rear wall 500 thus being inclined upwardly and forwardly thereby to provide the forward pivotal movement of the sweep auger in the direction 154 in response to the vertical oscillatory movement 188, as above-described in connection with the previous embodiments. A flange 491 extends downwardly and rearwardly from the lower extremity 490 of the back wall 488 toward the floor 26 but spaced therefrom. The downwardly and rearwardly extending flange 491 serves to inhibit picking up larger objects on the floor 26, such as stones, nuts, bolts, etc.

Referring now additionally to FIGS. 27 and 30, gear box 504 is attached to the outer end 506 of sweep auger housing 484 and has its input shaft 508 coupled to the outer end 174 of the sweep auger 88. Gear box 504 has an output shaft 510 having an axis 512. Wheel 514 having axis 516 is eccentrically mounted on the output shaft 510 with a slip connection now to be described. A hub 518 is eccentrically mounted on shaft 510 concentric with axis 516. Wheel 514 comprises an annulus or tire 520 of suitable material, such as rubber or neoprene, mounted on hub 518. Friction plates 522 and 524 are secured to opposite sides of the annular member 520 in any suitable fashion, as by bolts 526, plate 522 being engaged by annular flange 528 of hub 518. Plate 524 is engaged by plate 530 secured to the hub by a suitable bolt 533. Bolt 532 secures the assembly to the shaft 510. Suitable clutch material may be provided on the facing surfaces of flange 528, plate 522, plate 524 and plate 530. It will be seen that suitable adjustment of the bolt 533 will provide a slip connection between the annular member 520 and the plates 522, 524 on the one hand, and the hub 518 and the plate 530 on the other.

Gear box 504 has an output shaft 534 extending rearwardly therefrom, generally parallel with the floor 26 and at right angles to the axis of the sweep auger 88. Gear box 504 has another output shaft 538 extending forwardly therefrom, again generally parallel with the floor 26 and at right angles to the axis of the sweep auger 88. A vaned displacing wheel 540 is secured to the forward output shaft 538 for displacing grain from forwardly of the gear box 504.

It will be seen that the eccentric wheel 514, driven by the sweep auger 88 through the gear box 504 provides the vertical oscillatory motion 188 which, in conjunction with the propelling action of the auger 536 and the reaction of the sloping rear wall 500 of the housing 484, provides the forward pivotal motion of the sweep auger assembly in the direction 154, the combination of the eccentric wheel 514, auger 536 and displacing wheel 540 providing smooth constant-speed forward movement with the slip connection of the wheel 514 reducing tire wear and grinding of the grain. It will be seen that the propelling force is provided by the oscillatory motion of the shell and the pushing auger whether or not the tire is turning.

The vertical elevating auger includes a lower, relatively short section 542 having its lower end 544 connected to the input shaft of the gear box 82 and extending upwardly therefrom. Lower section 542 includes a double flite helix in order to assist in charging the upper portions of the vertical auger tube. The lower section 542 of the vertical auger is joined to an intermediate section 546 having a single helix flite, one of the flite helices of the lower portion 542 being a continuation of the single helix of the portion 546. Intermediate portion 546 of the vertical elevating auger in turn connects to upper portion 548 at joint 550, as best seen in FIG. 23. Lower auger tube section 552 surounds lower and intermediate elevating auger sections 542, 546 and has its lower end connected to housing 80 and communicating therewith, as seen in FIG. 28.

Impeller 282 (FIGS. 12 and 28) on the inner end 92 of the sweep auger 88 assists in delivery of the grain from the sweep auger 88 to the elevating auger. Lower elevating auger tube section 552 is connected to upper elevating auger tube section 554 by suitable flanges and bolts at joint 550, as seen in FIG. 23. Proper alignment of the elevating auger is assured by means of a suitable bearing 556 rotatably supporting the upper end 558 of the shaft of the intermediate auger section 546, bearing 556 being properly positioned by suitable bolts 560, as also seen in FIG. 23.

In the preferred embodiment, all of the flites of the elevating auger have an upwardly extending flange portion 562 formed on their outer periphery, as seen in FIG. 24.

The upper section 554 of the elevating auger tube is connected to a terminal section 564 by a swivel joint 566, shown in detail in FIG. 22. Swivel joint 566 comprises a flange 568 secured to the upper end of the upper auger tube section 554, another smaller flange 570 secured to the lower end of the terminal auger tube 564 and having a depending cylindrical flange portion 572 adapted to be received within the upper end of the upper auger tube section 554, an upper clamp ring 574, and intermediate rings 576 and 578. The assembly is held together by suitable bolts 580 extending through apertures in the flange 568 and the clamp rings 574. It will be seen that when the bolts 580 and their accompanying nuts 582 are loosened, relative rotation between the terminal auger tube 564 and the upper auger tube section 554 is permitted, whereas when the bolts are tightened, the terminal and upper auger tube sections 564, 554 are secured together for mutual rotation. A suitable supporting ring 584 embraces the upper auger tube section 554, permitting rotation of the same, and is connected to the side wall 22 of the bin 20 by suitable cables or chains 586, thus supporting and retaining the elevating auger assembly within the bin in the desired vertical position.

The upper end of the terminal auger tube section 564 is closed by the cap member 588 through which the upper end 94 of the elevating auger extends. Motor mounting bracket 590 is secured to the cap member 588 and supports motor 106 which operatively drives the elevating auger through pulleys 108 and 98 by conventional V-belts 110. A plate member 592 is supported above the pulleys and belts 98, 108, 110 in order to deflect grain scattered by the scattering disc 476. A conventional rotatable electrical connector 594 is mounted on the plate 592 and serves to connect the elevating auger drive motor 106 and the upper auger drive motor 598 to a suitable source of electrical power while permitting rotational movement of the terminal auger tube section 564 and the apparatus connected thereto, as will shortly be described.

In order to recirculate grain elevated by the elevating auger in the bin, or alternatively to remove grain from the bin, an upper auger 600 is provided within upper auger tube 602. Upper auger 600 comprises an elongated outer section 604 connected to an inner section 606 by a suitable universal joint 608. Upper auger tube 602 has its inner end 610 connected to housing 612 by a suitable flexible tube section 614. Housing 612 is in turn connected to and communicates with the terminal auger tube section 564. End 616 of inner auger section 606 extends through housing 612, being rotatably supported by a suitable bearing 618, and is operatively coupled to the motor 598 by suitable pulleys 620, 622 and conventional V-belt 624, as best seen in FIG. 21. As further seen in FIG. 21, shaft 616 of the inner auger portion 606 is offset from upper end 94 of the elevating auger. Motor 598 is supported by a suitable bracket 626 mounted on housing 612.

The outer end 628 of the upper auger tube 602 is supported by means of a suitable chain 630 connected to the plate 592 by a conventional turn buckle 632. It will be seen that the flexible tube section 614 in conjunction with the universal joint 608 permits pivotal movement of the upper auger tube 602 in a vertical plane, this pivotal movement permitting the positioning of the upper auger assembly above the eave line of the bin so as to permit filling the bin completely.

The upper auger tube 602 is provided with a plurality of axially spaced apertures 634 which are respectively selectively closed by manually operable, rotating bands or sleeves 636. When it is desired to employ the upper auger assembly for removing grain from the bin, thus permitting employment of the apparatus in a continuous-flow drying operation, a suitable extension auger, shown in dashed lines at 638 may be coupled to the outer end 628 to extend through a suitable opening in the wall of the bin 20.

It will now be seen that with the clamp bolts 580, 582 of the swivel joint 566 loosened, the upper auger assembly is permitted to remain in a fixed position, as when grain is being discharged from the bin with the use of the extension 638, with the lower sections of the elevating auger and the sweep auger assembly rotating as above-described. However, when it is desired to employ the upper auger assembly for recirculating grain in the bin, tightening of the clamp bolts 580, 582 will thus permit the upper auger to rotate in unison with the elevating auger tube and the sweep auger assembly.

Referring now particularly to FIGS. 27, 29, 30 and 31, an auxiliary bin sweep auger 640 is provided which may be removably connected to and operated by the stub output shaft 200 of the gear box 82. The unenclosed bin sweep auger 640 has its inner end 642 rotatably supported by a sleeve 644 and connected by a suitable universal joint 646 to the output shaft of a suitable chain drive gear box 648, which has its input shaft removably connected to the stub shaft 200. Sleeve 644 is supported for generally upward pivotal movement by means of a suitable bracket 650, pivotally connected to the chain drive 648, and a link 652, as best seen in FIG. 29. Bin sweep auger 640 has a wheel 654 intermediate its ends which engages the floor 26 and thus prevents damage to bin floor.

The outer end 656 of the bin sweep auger 640 is likewise supported upon the floor by a wheel 658 and is connected to the gear box 504 by arm 660 which has an end 662 pivotally connected to a bracket 664 extending upwardly from the forward portion of the gear box. It will now be seen that the arm 660 maintains the bin sweep auger 640 in a position generally parallel with the sweep auger 88 and its housing 484 and spaced forwardly from opening 494, the pivotal connection of arm 660 to the gear box 504 accommodating the upward pivotal movement of the bin sweep auger 640. The bin sweep auger 640 permits rapid unloading of the bin through the well 38 after gravity unloading has been reduced or terminated.

Figure 32:
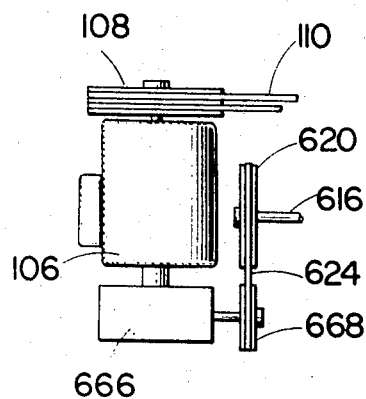
FIG. 32 is a fragmentary view showing one alternative arrangement for driving the upper auger of FIG. 20.

Referring now briefly to FIG. 32, the upper auger drive motor 598 may be eliminated and the upper auger shaft 616 driven from the elevating auger drive motor 106 by means of a suitable gear box 666 operably connected to motor 106 and driving shaft 616 through pulley 668, belt 624 and pulley 620.

Figure 33:
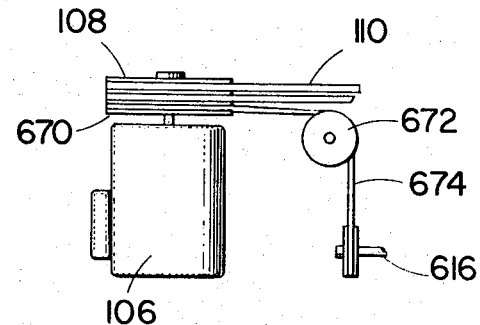
FIG. 33 is a fragmentary side view showing another alternative arrangement for driving the upper auger.

Referring now to FIG. 33, alternatively, the upper auger drive shaft 616 may be driven directly by motor 106 through pulley 670, pulleys 672 and V-belt 674.

It will be readily apparent that the apparatus of the invention may be employed not only for recirculating grain in the bin during the drying operation, but also for blending grain in the bin, or for continuously removing dried grain from the bottom of the bin and transporting it to another location. In applications where recirculation is not required, i.e., where the dried grain removed from the bottom of the bin is immediately transported to another location, the vertical auger may be eliminated and only the sweep auger assembly employed by supplying power from the underfloor auger.

While there have been described above the principles of this invention in connection with specific apparatus, it is to be clearly understood that this description is made only by way of example and not as a limitation to the scope of the invention.

What is claimed is:

1. Grain drying apparatus comprising: a bin having a perforated drying floor defining a space therebelow; means for supplying heated air to said space for upward flow through said floor and the grain thereover in said bin; a first elongated auger in said bin extending over said floor adjacent thereto and having an axis and inner and outer ends; means for mounting said first auger at said inner end for pivotal movement in a plane generally parallel with said floor; first means connected to said first auger for rotating said first auger about its axis in a direction to move grain toward said inner end, and for propelling said first auger to provide said pivotal movement in a predetermined direction; a second elongated auger in said bin having an axis and lower and upper ends, said second auger having said lower end positioned adjacent said inner end of said first auger communicating therewith and extending upwardly therefrom; second means for rotating said second auger about its axis in a direction to elevate grain from said lower end to said upper end; and distributing means communicating with said second auger adjacent said upper end thereof for distributing grain elevated thereby in said bin, whereby the dried strata of grain adjacent said floor is removed and redistributed over the body of grain in said bin to provide a continuous recirculating flow, said first means including means reacting with the grain in said bin for providing said pivotal movement.

2. The apparatus of claim 1 wherein said reacting means comprises differential gear means operatively coupling said lower end of said second auger to said inner end of said first auger.

3. The apparatus of claim 1 further comprising an elongated auger tube surrounding said second auger and having upper and lower ends, an elongated housing for said first auger and having an opening facing said direction of pivotal movement and exposing said first auger for admitting grain thereto, said housing having inner and outer ends, said inner end of said housing communicating with said lower end of said auger tube whereby grain moved to said inner end of said first auger is fed to said lower end of said second auger for elevation thereby.

4. The apparatus of claim 1 further comprising an elongated auger tube surrounding said second auger and having lower and upper ends, and wherein said second driving means comprises a motor operatively connected to said second auger, and wherein said first driving means comprises differential gear means operatively coupling said lower end of said second auger and said inner end of said first auger.

5. The apparatus of claim 4 wherein said auger tube is connected to said first auger and rotates with said pivotal movement of said first auger, and wherein said distributing means comprises an elongated scattering tube having an inner end connected to said auger tube adjacent said upper end thereof and communicating therewith, said scattering tube extending radially outwardly from said auger tube and rotating therewith, said scattering tube having a plurality of apertures therein for distributing grain elevated by said second auger.

6. The apparatus of claim 1 wherein said bin has an opening at the top theerof for introducing grain into said bin, and further comprising means on said second auger adjacent said upper end and exposed to said opening for scattering grain introduced through said opening into said bin.

7. The apparatus of claim 1 further comprising an elongated auger tube surrounding at least a part of said second auger and having an upper and lower ends, means for restraining rotation of said auger tube, said second driving means comprising a motor mounted on said auger tube adjacent said upper end thereof and operatively connected to said second auger adjacent said upper end thereof, said first driving means comprising gear means coupling said lower end of said second auger to said inner end of said first auger.

8. The apparatus of claim 1 wherein said distributing means comprises a third elongated auger having inner and outer ends extending generally radially outwardly from said second auger with its inner end adjacent said upper end of said second auger, and further comprising third means for driving said third auger in a direction to move grain radially outwardly from said second auger.

9. The apparatus of claim 8 wherein second driving means comprises a first motor operatively connected to said second auger, and said third driving means comprises a second motor operatively connected to said third auger.

10. The apparatus of claim 8 wherein said second driving means comprises a motor operatively connected to said second auger adjacent said upper end thereof, and said third driving means comprises means for operatively connecting said inner end of said third auger to said motor.

11. The apparatus of claim 8 further comprising a first elongated auger tube surrounding said second auger, a second elongated auger tube surrounding said third auger, and flexible means coupling said second auger to said first auger tube for providing communication therebetween and for permitting vertical pivotal movement of said second auger tube.

12. The apparatus of claim 8 further comprising an elongated auger tube surrounding said third auger and having a plurality of axially spaced grain discharge openings therein, and sleeve means rotatably mounted on said auger tube for respectively closing each of said openings.

13. The apparatus of claim 1 further comprising a first auger tube surrounding an upper portion of said second auger and having upper and lower ends, a second auger tube surrounding a lower portion of said second auger and having upper and lower ends and means for connecting said lower end of said first auger tube to said upper end of said second auger tube, said connecting means including means for selectively providing rotation and fixed connections between said first and second auger tubes.

14. The apparatus of claim 1 wherein said second auger has a first helical fliting extending throughout its length, said second auger having a relatively short portion extending upwardly from said lower end having a second helical positioned intermediate said first fliting.

References Cited

UNITED STATES PATENTS

| 2,634,513 | 4/1953 | Ladd et al. | 34—102 |
| 3,143,336 | 8/1964 | Byberg | 214—17.82 XR |
| 3,276,571 | 10/1966 | Vohl | 198—217 |
| 3,318,582 | 5/1967 | Fisher | 259—97 |
| 3,449,840 | 6/1969 | Francis | 34—187 |

FREDERICK L. MATTESON, Primary Examiner

H. B. RAMEY, Assistant Examiner

PO-1050
(5/69)

UNITED STATES PATENT OFFICE
CERTIFICATE OF CORRECTION

Patent No. 3,538,618      Dated November 10, 1970

Inventor(s) CHARLES D. NEUENSCHWANDER

It is certified that error appears in the above-identified patent and that said Letters Patent are hereby corrected as shown below:

SPECIFICATION

Column 1, line 30 - "upped" should be --upper--;
Column 4, line 31 - "empoyed" should be --employed--;

Column 8, line 36 - "auger" should be --upper--;
Column 12, line 13 - "39" should be --396--;
        line 14 - "tub" should be --tube--;

CLAIMS

Claim 7, line 71 - "an" should be deleted;
Claim 11, line 25 - --tube-- should be inserted after "second auger";
Claim 13, line 11 - "rotation" should be --rotating--;
Claim 14, line 17 - --fliting-- should be inserted ahead of "positioned";

Signed and sealed this 10th day of August 1971.

(SEAL)
Attest:

EDWATD M. FLETCHER, JR.
Attesting Officer

WILLIAM E. SCHUYLER, JR.
Commissioner of Patents